(12) United States Patent
Madhogarhia

(10) Patent No.: US 7,761,384 B2
(45) Date of Patent: Jul. 20, 2010

(54) STRATEGY-DRIVEN METHODOLOGY FOR REDUCING IDENTITY THEFT

(76) Inventor: Sushil Madhogarhia, 23920 Pentland Way, West Hills, CA (US) 91307

( * ) Notice: Subject to any disclaimer, the term of this patent is extended or adjusted under 35 U.S.C. 154(b) by 1016 days.

(21) Appl. No.: 11/377,799

(22) Filed: Mar. 16, 2006

(65) Prior Publication Data

US 2007/0219928 A1 Sep. 20, 2007

(51) Int. Cl.
G06Q 20/00 (2006.01)
G06F 7/04 (2006.01)
(52) U.S. Cl. ............................. 705/75; 726/5
(58) Field of Classification Search ................. 705/75
See application file for complete search history.

(56) References Cited

U.S. PATENT DOCUMENTS

| | | | |
|---|---|---|---|
| 6,308,203 B1 | 10/2001 | Itabashi et al. | |
| 6,317,783 B1 | 11/2001 | Freishtat et al. | |
| 6,360,324 B2 | 3/2002 | Van Blarkom | |
| 6,405,245 B1 | 6/2002 | Burson et al. | |
| 6,633,915 B1 | 10/2003 | Hashimoto | |
| 6,725,200 B1 | 4/2004 | Rost | |
| 6,842,752 B2 | 1/2005 | Itabashi et al. | |
| 6,859,878 B1 | 2/2005 | Kerr et al. | |
| 6,871,220 B1 | 3/2005 | Rajan et al. | |
| 6,904,526 B1* | 6/2005 | Hongwei | 713/182 |
| 7,231,657 B2* | 6/2007 | Honarvar et al. | 726/2 |
| 7,240,364 B1* | 7/2007 | Branscomb et al. | 726/9 |
| 2003/0037262 A1* | 2/2003 | Hillhouse | 713/202 |
| 2005/0005168 A1 | 1/2005 | Dick | |
| 2005/0039057 A1* | 2/2005 | Bagga et al. | 713/202 |
| 2005/0097106 A1* | 5/2005 | Lineman | 707/10 |
| 2005/0129246 A1 | 6/2005 | Gearhart | |
| 2005/0289052 A1* | 12/2005 | Wankmueller | 705/40 |
| 2006/0084472 A1* | 4/2006 | Park | 455/558 |
| 2007/0033649 A1* | 2/2007 | Henriksen | 726/20 |

FOREIGN PATENT DOCUMENTS

JP 09179827 7/1997

OTHER PUBLICATIONS

I-En Liao, Cheng-Chi Lee, Min-Shiang Hwang, "A Password authentication scheme over insecure networks", Journal of Computer and and System Sciences, Nov. 10, 2005, pp. 728-740.*
Dan Mossop, Ronald Pose, "Security Models in the Password-Capability System", TENCON 2005 IEEE Region 10, vol. nol, pp. 1-6, Nov. 21-24, 2005.*
I-En Liao, Cheng-Chi Lee; Min-Shiang Hwang;, "Security enhancement for a dynamic ID based remote user authentication scheme," Next Generation Web Services Practices, 2005. NWesp'05. International Conference on, vol., No., pp. 4 pp., Aug. 22-26, 2005.*
Bank of America Online Banking Login Pages (3 pages total).

* cited by examiner

*Primary Examiner*—James P Trammell
*Assistant Examiner*—Mohammad Z Shaikh

(57) ABSTRACT

A strategy-driven methodology for reducing identity theft comprises the steps of attempting to gain system access, and presenting at least one list of user choices instead of granting system access, as practiced conventionally. The presented list contains at least one choice that is preset by a registered user. Other steps include selecting at least one choice from the presented list, and granting system access if the selected choice matches the preset choice.

30 Claims, 20 Drawing Sheets

STRATEGY-DRIVEN METHODOLOGY FOR REDUCING IDENTITY THEFT

COPYRIGHT NOTICE

Portions of the disclosure of this patent document may contain material that is subject to copyright and/or mask work protection. The copyright and/or mask work owner has no objection to the facsimile reproduction by anyone of the patent document or the patent disclosure, as it appears in the Patent and Trademark Office patent file or records, but otherwise reserves all copyright and/or mask work rights whatsoever.

BACKGROUND

Identity theft is not just a consumer protection issue but also an economic issue, law enforcement issue, and a national security issue. Consumers do not seem to have faith any more in the current identity protection system and feel powerless. It is the consumers who are ultimately affected by identity theft not only financially, but also emotionally and physically. Consumers are traumatized when their identity is stolen, and it is difficult to put a value on such trauma.

Consumers are frustrated with the need to remember numerous passwords that they set for different systems. Consumers are also frustrated with the seemingly endless need to change their passwords for various systems. Consumers are further frustrated by loss of personal information via the postal system, diversion of personal mail in the wrong hands, misuse of solicitations, stolen computer data, credit card change when some illegal activity is suspected, and loss of productivity in shredding documents containing personal information, clean up of cookies on PCs (Personal Computers), watching out for illegal system intrusions, and the constant worrying about valuable personal information that may be stolen from home, office or laptop computers, mobile PCs, mobile telephones, etc.

Consumers just do not feel secure any more as far as their personal identity information is concerned. Nowadays, it is not so difficult to uncover someone's date of birth and/or social security number. In fact, such sensitive personal information may be available on the World-Wide Web (WWW). Computer users are often lured into visiting seemingly legitimate websites (also known as "phishing") where e-mail containing sensitive personal information is being intercepted for the purpose of illegally acquiring the same. The term "phishing" generally refers to a method of identity theft carried out through the creation of a website that seems to represent a legitimate company. Visitors to such websites are asked to submit personal information to the website. Criminal elements operating the website use the submitted personal information for their own purposes, or sell the submitted personal information to third parties for profit.

It is no longer safe to discard papers containing personal information in the trash; as such papers may be retrieved by criminals who plow through trash cans for pieces of non-shredded personal information such as personnel records, payroll information, insurance papers, account information, bank statements, tax documents, pre-approved credit offers, convenience checks, etc. Some criminals gain legitimate access to someone's home and personal information such as through household work, babysitting, healthcare, friends or roommates. Other criminals gain personal information by fraudulently posing as someone who has a legitimate reason to access the victim's personal information (e.g. a landlord or employer asking for background information). Yet others trick the consumer into providing personal identifying or financial data over the telephone, intercept account information sent via e-mail, online chat session(s), etc.

Moreover, today's economy increasingly relies on non-cash transactions between business enterprises and consumers, such as via personal checks, credit/debit cards. Credit/debit cards may be lost or stolen resulting in unauthorized charges by unscrupulous users who assume the identity of the credit card holder. Such unauthorized users draw cash and or incur various charges against the cardholder's account for their own benefit. For example, some criminally inclined restaurant employees may use the printed impression of the customer credit/debit card number with the customer signature to charge online purchases for their own benefit. Various other schemes are being used to illegally gain access to legitimate customer bank accounts, online store credit accounts and/or the like.

SUMMARY

Some exemplary embodiments disclosed herein are generally directed to a strategy-driven methodology for reducing identity theft.

In accordance with one aspect of the invention, the strategy-driven methodology comprises the steps of attempting to gain system access, and presenting at least one list of user choices instead of granting system access. The list contains at least one choice that is preset by a registered user. Other steps include selecting at least one choice from the list, and granting system access if the selected choice matches the preset choice.

In accordance with another aspect of the invention, the strategy-driven methodology comprises the steps of inputting a password in an attempt to gain system access, checking the input password for accuracy, and inputting a response to at least one system query preset by a registered user if the input password is accurate. Other steps include checking the input response for accuracy, and granting system access if the input response to the preset system query is accurate.

In accordance with still another aspect of the invention, the strategy-driven methodology comprises the steps of operatively coupling a computer to a secure system website over a network, inputting a system password via the computer, and checking the input system password for accuracy. Other steps include inputting a response to at least one system query preset by a registered user if the input system password is accurate, checking the input response for accuracy, and granting access to the secure system website if the input response to the preset system query is accurate.

In accordance with yet another aspect of the invention, the strategy-driven methodology comprises the steps of inputting a user name as part of a system login sequence, checking the input user name for accuracy, inputting a system password if the input user name is accurate, and checking whether the input system password is correct. Other steps include selecting at least one choice from an option list preset by a registered user if the input system password is correct, checking the selected choice for accuracy, and granting system access if the selected choice from said preset option list is accurate.

In accordance with a further aspect of the invention, the strategy-driven methodology comprises the steps of inputting a user name as part of a system login sequence, checking the input user name for accuracy, inputting a system password if the input user name is accurate, and checking whether the input system password is correct. Other steps include selecting at least one choice from a first option list preset by a registered user if the input system password is correct, checking the selected choice from the first preset option list for accuracy, selecting at least one choice from a second option list if the selected choice from the first preset option list is not accurate. The second option list contains randomly generated system choices and choices preset by a registered user. Further steps include checking the selected choice from the second option list for accuracy, and granting system access if the selected choice from the second option list is accurate.

Other exemplary embodiments disclosed herein are generally directed to a method for reducing credit card transaction fraud.

In accordance with one aspect of the invention, the method comprises the steps of providing credit card information to an online merchant or bank, utilizing the online merchant or bank to verify the credit card CVV (Card Verification Value), and selecting at least one choice from a first option list presented by the online merchant or bank if the credit card CVV is verified. The first option list contains randomly generated system choices and choices preset by the credit card owner. Other steps include utilizing the online merchant or bank to check the selected choice from the first option list for accuracy, selecting at least one choice from a second option list if the selected choice from the first option list is not accurate. The second option list contains randomly generated system choices and choices preset by the credit card owner. Further steps include utilizing the online merchant or bank to check the selected choice from the second option list for accuracy, and processing the credit card transaction if the selected choice from the second option list is accurate.

In accordance with another aspect of the invention, the method comprises the steps of swiping a credit card or manually entering credit card information via an interface device employed by a merchant credit card processing system, inputting at least one credit card identifier requested by the merchant credit card processing system, utilizing the merchant credit card processing system to verify the input credit card identifier, and selecting at least one choice from an option list presented by the merchant credit card processing system if the input credit card identifier is verified. The option list contains choices preset by the credit card owner. Other steps include utilizing the merchant credit card processing system to check the selected choice(s) for accuracy, and processing the credit card transaction if the selected choice(s) is/are accurate.

In accordance with another aspect of the invention, the method comprises the steps of waving a contactless credit card in proximity to an interface device employed by a contactless credit card processing system to input credit card information, and selecting at least one choice from an option list presented by the contactless credit card processing system if the input credit card information is correct. The option list contains choices preset by the contactless credit card owner. Other steps include utilizing the contactless credit card processing system to check the selected choice(s) for accuracy, and processing the credit card transaction if the selected choice(s) is/are accurate.

Still other exemplary embodiments disclosed herein are generally directed to a method for reducing checking transaction fraud.

In accordance with one aspect of the invention, the method comprises the step of swiping a check via a check processing system interface device employed by a business entity. The check contains at least one cryptographically stored password. Other steps include utilizing the business entity check processing system to decrypt the stored password, and verify the decrypted password. Further steps include clearing the check if password verification succeeds, and returning the check if password verification fails.

In accordance with another aspect of the invention, the method comprises the step of swiping a check via a check processing system interface device employed by a business entity. The check contains at least one cryptographically stored password. Other steps include utilizing the business entity check processing system to decrypt the stored password, and verify the decrypted password. Further steps include inputting a security identifier associated with the swiped check if password verification succeeds, using the business entity check processing system to verify the input security identifier, and clearing the check if security identifier verification succeeds.

In accordance with still another aspect of the invention, the method comprises the steps of swiping a check via a check processing system interface device employed by a business entity, and utilizing the check processing system to verify the swiped check. Other steps include inputting at least one check password preset by the checking account owner if check verification succeeds, using the check processing system to verify the input check password, and clearing the check if preset check password verification succeeds.

In accordance with yet another aspect of the invention, the method comprises the steps of swiping a check via a check processing system interface device employed by a business entity, utilizing the business entity check processing system to verify the swiped check, and selecting at least one user choice from an option list preset by the checking account owner if check verification succeeds. Other steps include using the check processing system to check said at least one selected choice for accuracy, and clearing the check if the selected choice is accurate.

In accordance with a further aspect of the invention, the method comprises the step of swiping a check via a check processing system interface device employed by a business entity. The check contains at least one cryptographically stored password. Other steps include utilizing the check processing system to decrypt the stored password, and verify the decrypted password. Another step includes selecting at least one user choice from an option list if decrypted password verification succeeds. The option list contains at least one user choice being preset by the checking account owner. Further steps include using the business entity check processing system to check the selected choice for accuracy, and inputting a security identifier associated with the swiped check if the selected choice is accurate. Yet further steps include using the business entity check processing system to verify the input security identifier, and clearing the check if security identifier verification succeeds.

In accordance with a still further aspect of the invention, the method comprises the step of swiping a check via an interface device employed by a check cashing terminal. The check contains at least one cryptographically stored password. Other steps include utilizing the check cashing terminal to decrypt the stored password, and inputting at least one password stored on said check. The check cashing terminal is also used to check the input password against the decrypted password, measure the intensity of light reflected from the swiped check, and compare the measured intensity against an associated database of preset light reflection intensities for checks issued by banking institutions if the password check succeeds. Further steps include using the check cashing terminal to verify the measured intensity, and clearing the check if the measured intensity verification succeeds.

Further exemplary embodiments disclosed herein are generally directed to a secure system access method.

In accordance with one aspect of the invention, the method comprises the step of selecting at least one question from a system list of questions. Each question from the system list is presented with an associated list of responses. Each response and question is respectively preset by an authorized user. Other steps include selecting at least one response to the selected question from the associated list of responses, checking the selected response for accuracy, and granting system access if the selected response is accurate.

Still further exemplary embodiments disclosed herein are generally directed to a method for securely providing personal identification information.

In accordance with one aspect of the invention, the method comprises the steps of establishing a communication link by a commercial entity with a consumer, requesting personal identification information from the consumer over the communication link, and a "for call" password from the commercial entity over the communication link. Another step includes checking the provided "for call" password for accuracy. The password checking is being performed by the consumer. Still another step includes providing the requested personal identification information by the consumer over the communication link if the provided "for call" password is accurate.

In accordance with another aspect of the invention, the method comprises the steps of establishing a communication link by a commercial entity with a consumer, requesting personal identification information from the consumer over the communication link, and a "for call" password from the commercial entity over the communication link. The "for call" password has been set up in advance by an authorized user with the commercial entity. Other steps include checking the provided "for call" password for accuracy (with the password checking being performed by the consumer, and requesting that the consumer attempt a system login if the provided "for call" password is accurate. The system is maintained by the commercial entity. Further steps include utilizing the commercial entity system to check whether the attempted login is successful, requesting that the consumer input at least one instant password provided by the system if the system login is successful, using the commercial entity system to check whether the input instant password is correct, and providing the requested personal identification information over the communication link if the input instant password is accurate.

In accordance with still another aspect of the invention, the method comprises the steps of establishing a communication link by a consumer with a commercial entity, requesting personal identification information from the consumer over the communication link, and checking the provided consumer personal identification information for accuracy. The information checking is being performed by a personal identification processing system maintained by the commercial entity. Other steps include requesting that the consumer attempt a system login using at least one instant password provided by the commercial entity if the provided personal identification information is accurate, utilizing the system to check whether the instant password input is correct, and to complete consumer identity verification if the input instant password is correct.

Different exemplary embodiments disclosed herein are generally directed to a secure port access method.

In accordance with one aspect of the invention, the method comprises the step of inputting a first password by a person desiring to gain local port access. A "correct" first password has been set in advance of travel to at least one destination by a verified user. Other steps include checking the input first password for accuracy, and inputting a second password to gain local port access if the first input password is accurate. A "correct" second password has been set in advance of travel to the destination by the verified user. Further steps include checking the second input password for accuracy, and granting local port access if the second input password is accurate.

In accordance with another aspect of the invention, the method comprises the steps of setting up first and second port entry passwords before travel to a foreign port, and inputting two passwords upon arrival in the foreign port. Other steps include checking whether the two input passwords match the preset first and second port entry passwords, and granting foreign port entry if the two input passwords match the preset first and second port entry passwords.

An alternative exemplary embodiment disclosed herein is generally directed to a secure account solicitation method.

In accordance with one aspect of the invention, the method comprises the steps of setting up a password for new account solicitation with an independent third party, filling out a new account application, and listing a password on the new account application. Other steps include checking for a match between the listed password and the preset new account solicitation password, and establishing a new account if the listed password matches the preset new account solicitation password.

Another alternative exemplary embodiment disclosed herein is generally directed to a secure e-mail access method.

In accordance with one aspect of the invention, the method comprises the step of selecting at least one choice from an option list presented by an e-mail processing system in an attempt to access at least one portion of a received e-mail. The option list contains one or more choices preset by an authorized system user. Other steps may include checking the selected choice(s) for accuracy, and granting access to at least one portion of the received e-mail if the selected choice(s) is/are accurate.

Yet another alternative exemplary embodiment disclosed herein is generally directed to a secure ATM access method.

In accordance with one aspect of the invention, the method comprises the steps of inputting a user PIN (Personal Identification Number) as part of an ATM (Automated Teller Machine) system login sequence, and checking the input user PIN for accuracy. Other steps may include selecting at least one choice from an option list preset by a bank account owner if the input user PIN is correct, checking the selected choice(s) for accuracy, and granting ATM system access if the selected choice(s) from the preset option list is/are accurate.

Still another alternative exemplary embodiment disclosed herein is generally directed to a method for securely issuing an online boarding pass.

In accordance with one aspect of the invention, the method comprises the step of selecting at least one choice from an option list presented by an online boarding pass issuing system. The option list contains one or more choices preset by an authorized system user. Other steps may include checking the selected choice(s) for accuracy, and issuing an online boarding pass if the selected choice(s) is/are accurate.

These and other aspects of the invention will become apparent from a review of the accompanying drawings and the following detailed description of the invention.

BRIEF DESCRIPTION OF THE DRAWINGS

The present invention is generally shown by way of reference to the accompanying drawings in which.

DETAILED DESCRIPTION

The detailed description set forth below in connection with the appended drawings is intended as a description of exemplary embodiments and is not intended to represent the only forms in which the exemplary embodiments may be constructed and/or utilized. The description sets forth the functions and the sequence of steps for constructing and operating the exemplary embodiments in connection with the illustrated embodiments. However, it is to be understood that the same or equivalent functions and sequences may be accomplished by different embodiments that are also intended to be encompassed within the spirit and scope of the present invention.

Some embodiments of the present invention will be described in detail with reference to a strategy-driven methodology for reducing identity theft, as generally shown in FIGS. 1-13. Additional embodiments, features and/or advantages of the invention will become apparent from the ensuing description or may be learned by practicing the invention. In the figures, the drawings are not to scale with like numerals referring to like features throughout both the drawings and the description.

Figure 1:
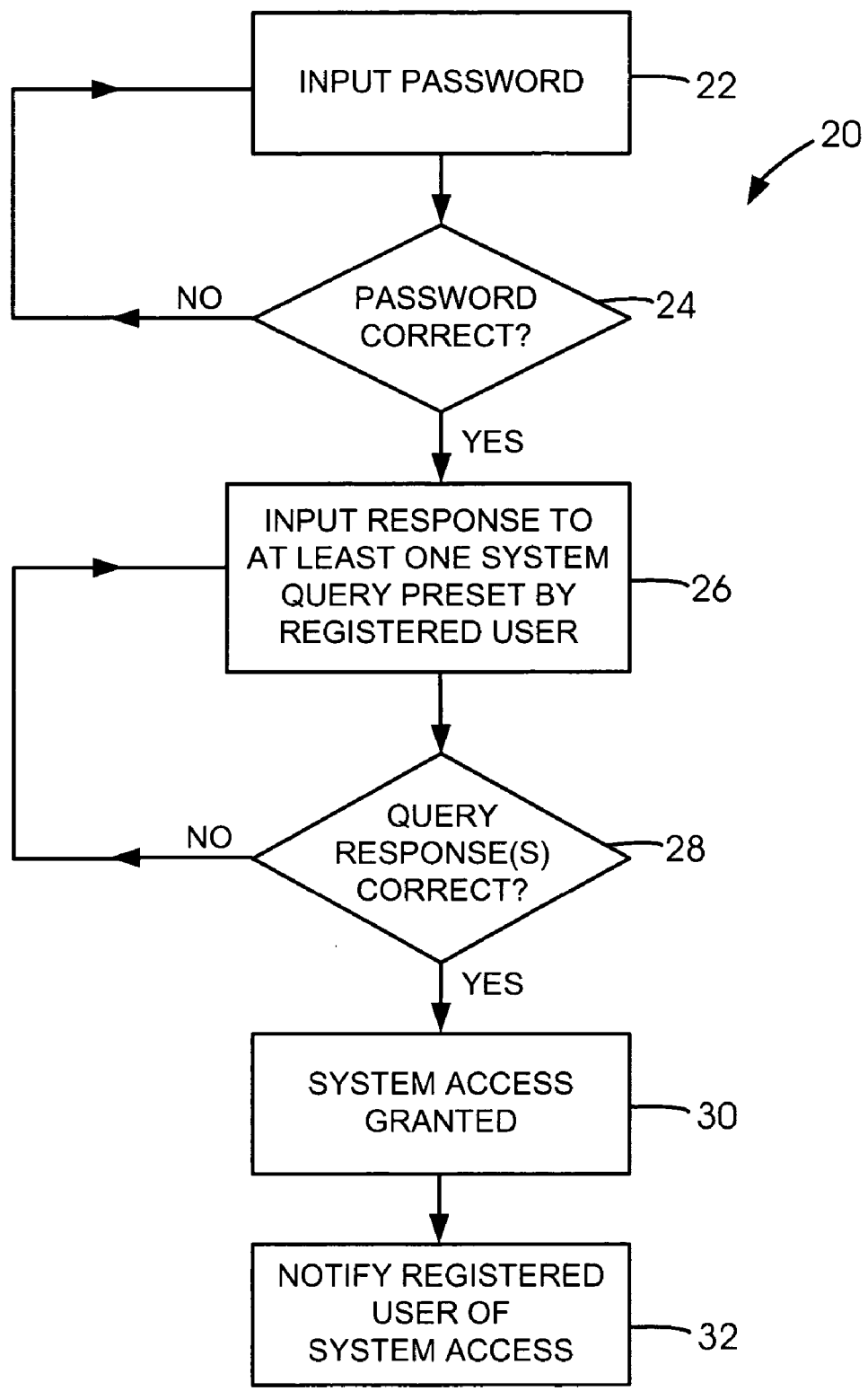
FIG. 1 is a flow chart of a strategy-driven methodology for reducing identity theft in accordance with one embodiment of the present invention.

FIG. 1 is a flow chart of a strategy-driven methodology 20 for reducing identity theft in accordance with one embodiment of the present invention. Particularly, a user inputs a password (step 22) in an attempt to gain system access. The term "system" may be generally defined as a group or set of interdependent entities that interact regularly to perform certain task(s). In certain applications, the term "system" may be generally defined by the hardware and software components that run a plurality of interconnected computers. In other applications, the term "system" may generally refer to a setup for collection, storage and processing of data. Other system definitions may be applicable provided there is no deviation from the intended purpose of the present invention.

The system checks the input password against its database of stored passwords (step 24). If the input password is incorrect (no match), the user may try to input a new password, i.e. step 22 is repeated (FIG. 1). If the input password is correct (i.e. it matches a stored preset password), the system is configured to respond with a list of queries instead of granting immediate system access to the user, as practiced conventionally. The list contains randomly generated queries and at least one query that has been preset by a registered (authenticated) user. The system may be adapted to generate random user queries in accordance with appropriately configured algorithms. Algorithms of this type are generally known in the art as random number generators. For example, a random number generator may be operatively integrated with a database containing a large number of user queries with each query being assigned a certain number or value. These numbers or values may be randomly generated whereby each generated number or value would correspond to a certain user query which may be pulled out of the database and displayed to the user as part of the list of queries. Other suitable techniques and/or algorithms may be utilized in accordance with the general principles of the present invention, as needed.

The system retrieves one or more of the queries preset by the registered user from an appropriate database and adds the same to the randomly generated queries to form a list of queries for presentation to the user. The query or queries may be in the form of question(s), request(s) for information and/or the like. For example, the system may inquire about a favorite food, pastime, trip, automobile, the names of old college friends or professors, movies, theatre and/or the like. The user may be prompted with a list of queries visually and/or audibly. Other suitable means of prompting the user may be utilized, as needed.

To successfully pass this stage, a system user would have to identify which query or queries from the list (presented by the system) has/have been preset by the registered user and input the correct response to the preset query or queries (step 26). The correct response to one or more preset query(s) has/have been set in advance by the registered user with all correct responses being stored in a system database. The system checks the input query response against its database to determine if there is a match (step 28).

If the input query response(s) is/are incorrect (no match), the user is denied system access. At this point, the user may repeat step 26 (FIG. 1). If the input query response(s) is/are correct (i.e. match one or more stored query response(s) preset by the registered user), system access is granted to the user (step 30). A response to a query posed by the system may be input in a variety of ways, as generally described hereinafter. The system may be configured optionally to notify the registered user of the system access (step 32). The notification may be by telephone, e-mail, fax, mail and/or the like.

Figure 2:
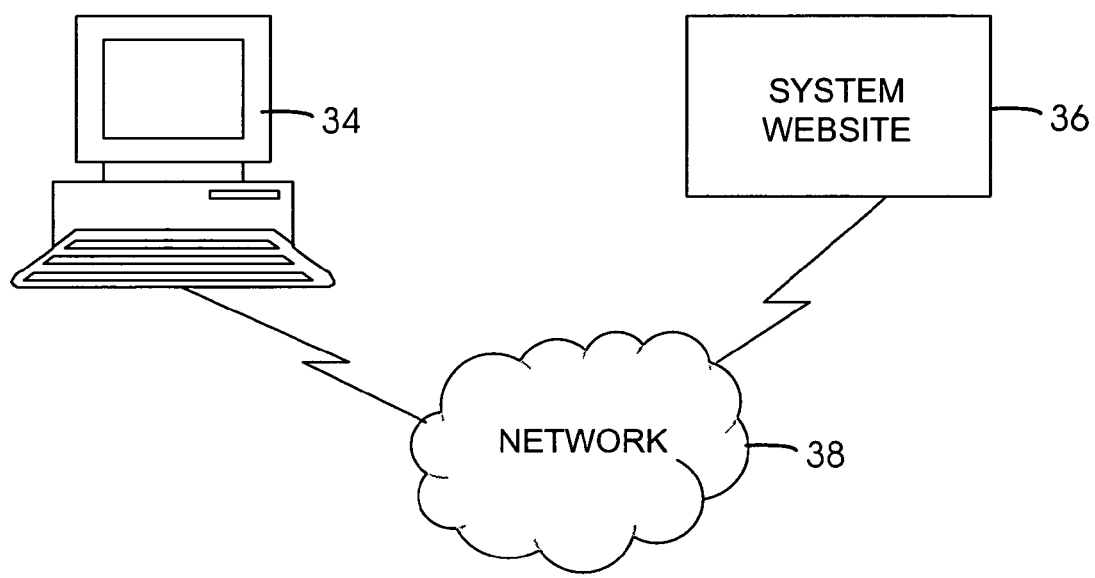
FIG. 2 is an exemplary implementation of the strategy-driven methodology of FIG. 1 in accordance with the present invention.

FIG. 2 is an exemplary implementation of strategy-driven methodology 20 in accordance with the present invention. Particularly, a user may utilize a personal computer (PC) 34 and methodology 20 (FIG. 1) to gain access to a secure system website 36 via a public or private network 38. If the user is in fact an authenticated user, access to secure system website 36 will be granted. Other implementations of strategy-driven methodology 20 may be possible, as long as such other implementations do not depart from the scope and spirit of the present invention.

Figure 3:
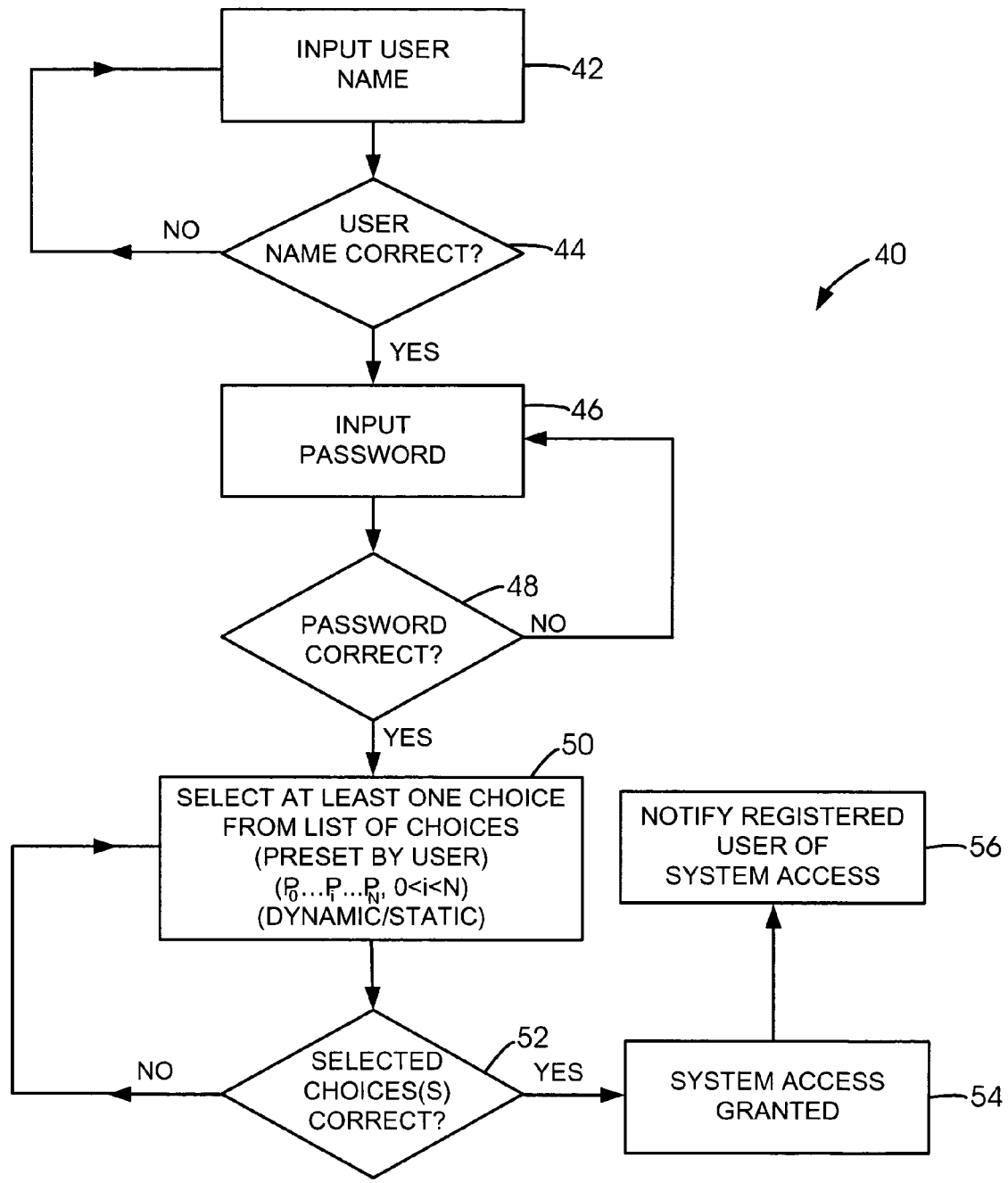
FIG. 3 is a flow chart of a strategy-driven methodology for reducing identity theft in accordance with another embodiment of the present invention.

FIG. 3 is a flow chart of a strategy-driven methodology 40 for reducing identity theft in accordance with another embodiment of the present invention. Particularly, a system user inputs his/her user name (step 42) as part of a system login sequence. The system compares the input user name against its database of stored (authorized) user names (step 44). If the input user name is incorrect (no match), the system user would need to repeat step 42. If the input user name is correct (matches a stored authorized user name), the system requests that the user input a password (step 46).

The system compares the input password against its database of stored (authorized) passwords (step 48). If the input password is incorrect (does not match a stored password), the system user repeats step 46. If the input password is correct (i.e. it matches a stored password), the system is programmed to present a list of choices or options $\{P_o \ldots P_i \ldots P_N, 0<i<N,$ where N is a finite number$\}$ to the system user instead of granting system access, as practiced conventionally. A person skilled in the art would appreciate that system programming may be done in software and/or hardware, as needed. Specifically, the system requests that the user select at least one choice $P_i$ from the presented option list (step 50). The system login attempt may be in connection with an online brokerage account, mortgage account, banking account, credit/debit account and/or the like.

The entire list of choices $\{P_o \ldots P_i \ldots P_N, 0<i<N,$ where N is a finite number$\}$ has been set in advance by an authenticated user with at least one choice $P_i$ being pre-designated as the correct choice(s) by the authenticated user. Particularly, an authenticated user would have preset correct and incorrect choices or options via an appropriate system interface. It is contemplated that it would be relatively easier for the average authorized system user to remember visually which one(s) of the presented options (that were picked in advance by him/her) are correct as opposed to having to remember a number of different system access passwords, as practiced conventionally.

The choices or options presented to the user may be in the form of statements. The presented statements may be dynamic and/or static. A dynamic statement may be generally defined as a statement containing one or more pieces of information that dynamically change based on one or more attributes. Attributes may have to do with "time," "location," etc. Examples of such attributes may include the date of the month, the season of the year, the day of the week, the year, the system location and/or the like. A static statement may be generally defined as a statement containing one or more pieces of information that do not change based on attributes used, i.e. remain static. As generally illustrated in reference to FIGS. 4-5, one exemplary list of statements presented by the system may be as follows:

1. I was in New York last week;
2. I like bagels;
3. I lived in Tahiti once;
4. I go to the bank every Monday;
5. Today is Tuesday;
6. Today is Wednesday;
7. Today is Monday;
8. My Birthday is on Jul. 15, 1965;
9. I went to Bahamas last week;
10. I enjoy watching Larry King Live®; and
11. My Social Security Number is 658-44-1775.

For example, an authenticated user may preset statement #1, statement #2, statement #3, statement #4, statement #9, and statement #10 as static choices. Statement #5, on the other hand, may be preset as a dynamic choice by the authenticated user. For example, "Tuesday" may be preset to correspond to today's day plus one day. Thus, the statement "Today is Tuesday" would be a correct choice if the current day of the week is Monday, i.e. Monday plus one day would correspond to Tuesday. A person skilled in the art would readily appreciate that only an authenticated user would know that the statement "Today is Tuesday" is in fact a correct choice even though today's day is actually Monday. Unauthorized users would probably not pick this statement as the correct choice since it is counterintuitive to expect that an obviously incorrect statement as to today's day could in fact be a correct choice.

Similarly, the Social Security Number in statement #11 may be a correct choice if its last digit equals the sum of the last digit from the Social Security Number of the authenticated user plus a number corresponding to the number of day of the week. For example, if today's day is Wednesday (the 3rd day of the week) and the actual (correct) Social Security Number of the authenticated user is 658-44-1772, then selecting statement #11 by the user as one of the choices would be correct, i.e. it would serve to verify that the current user is in fact an authenticated user. The remaining options may have been preset as dynamic or static statements, as needed. Various other dynamic statement rules may be devised or utilized, provided such other dynamic statement rules do not deviate from the intended purpose of the present invention.

After the user has selected at least one choice from the presented option list, the system checks if the selected choice(s) is/are correct (step 52). If so, system access is granted (step 54). If not, the user is denied system access, and may repeat step 50. After system access is granted, the system may be optionally set up to notify the registered (authenticated) user of the system access (step 56). The notification may be performed in any suitable manner, e.g. by telephone, e-mail, fax, mail and/or the like.

A person skilled in the art would appreciate that users are not forced to manually input (i.e. type on a computer keyboard) responses to questions or information requests by the system, as practiced conventionally. Rather, users are simply asked to select one or more correct choices from the presented lists of options. The selection may be done on a touch screen, via voice recognition, RFID (Radio Frequency Identification), by transmitting fingerprint data, DNA profile or biometric measurements through an appropriate system interface or by simply checking/unchecking items on a list presented by the system.

Other means of selecting the correct choice(s) may be used, as needed. This avoids the danger of phishing, key loggers and the like as two-way communication has been established and the user is in control. Moreover, there is no need to remember passwords or related login data for various user accounts. It is obviously much easier to recall correct statements visually presented by the system, than to stare at a blank field on the screen trying to remember the correct password from an ever-increasing entourage of secure passwords and login data that the average system user is supposed to remember at all times.

Figure 6:
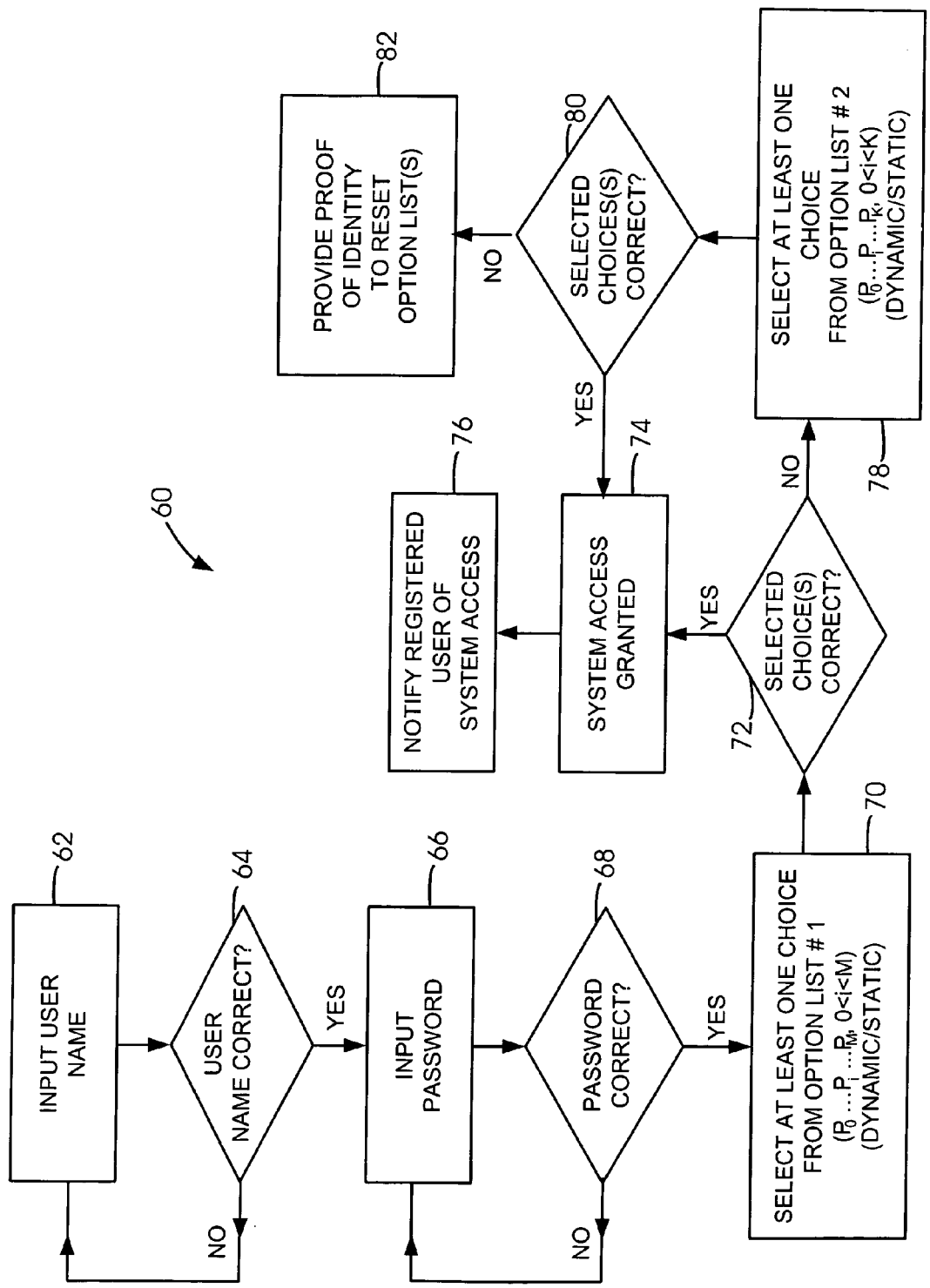
FIG. 6 is a flow chart of a strategy-driven methodology for reducing identity theft in accordance with yet another embodiment of the present invention.

FIG. 6 is a flow chart of a strategy-driven methodology 60 for reducing identity theft in accordance with yet another embodiment of the present invention. Particularly, a user name is input (step 62) as part of a system login sequence. The system compares the input user name against its database of authorized user names (step 64). If the input user name does not match a stored user name, the system user would have to repeat step 62. If the input user name is correct (i.e. it matches a stored user name), the system requires a password (step 66) as part of the login sequence.

The user inputs a password, and the system compares the input password against its database of stored passwords (step 68). If the input password is incorrect, the system user repeats step 66. If the input password is correct (i.e. it matches a stored password), the system is configured to present a list of choices or options $\{P_o \ldots P_i \ldots P_M, 0<i<M,$ where M is a finite number$\}$ to the user instead of granting system access, as practiced conventionally. Specifically, the system requests that the user select at least one choice $P_i$ from the presented option list (step 70). The system login attempt may be in connection with a commercial account, loan account, consumer account, credit/debit account and the like.

The entire list of choices has been set in advance by an authenticated user with at least one choice $P_i$ being pre-designated as the correct choice(s) by the authenticated user. Particularly, an authenticated user has preset correct and incorrect choices or options via an appropriate system interface. The list of choices may be in the form of statements. The presented statements may be dynamic and/or static, as described hereinabove in reference to FIGS. 3-5. After the user has selected at least one choice from the presented option list, the system checks if the selected choice(s) is/are correct (step 72). If so, system access is granted (step 74). After system access is granted, the system may be optionally configured to notify the authenticated (registered) user of the system access (step 76). The notification may be performed in any suitable manner, e.g. by telephone, e-mail, fax, mail and/or the like.

If the selected choice(s) is/are incorrect, the system is configured to present another list of choices or options $\{P_0 \ldots P_i \ldots P_K, 0<i<K,$ where K is a finite number$\}$ to the user. This (second) option list may contain choices that are randomly generated by the system as well as choices that have been set in advance by an authorized (registered) user. At least one of the preset choices $P_i$ would have been pre-designated as the correct choice by the authenticated user. The system may be adapted to generate random user choices using generally known algorithms, as described hereinabove. The system retrieves one or more of the choices that were preset by an authorized user from an appropriate database and adds the same to the randomly generated choices to form the second option list for the user.

Figure 4:
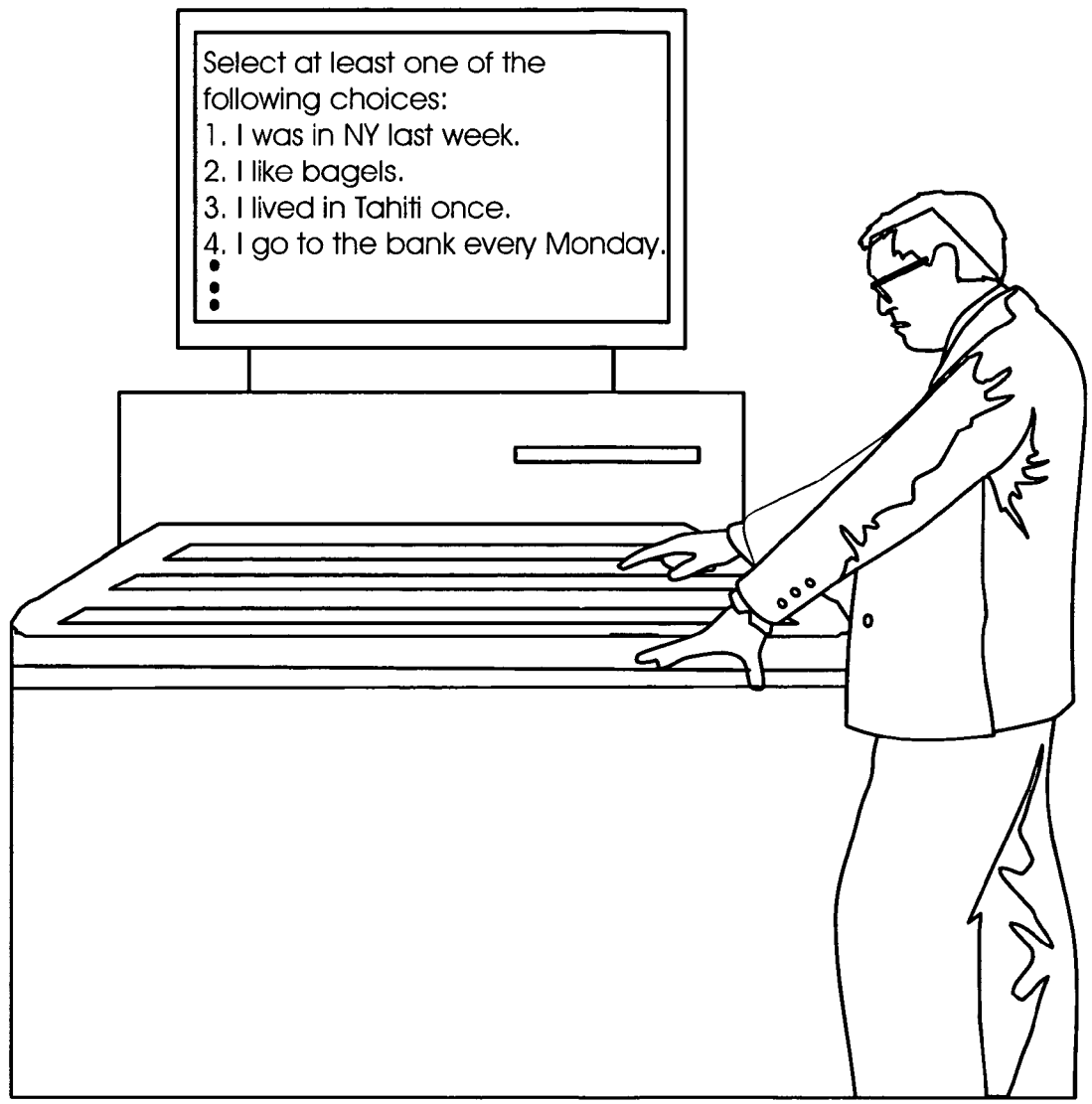
FIG. 4 is an exemplary implementation of the strategy-driven methodology of FIG. 3 in accordance with the present invention.
Figure 5:
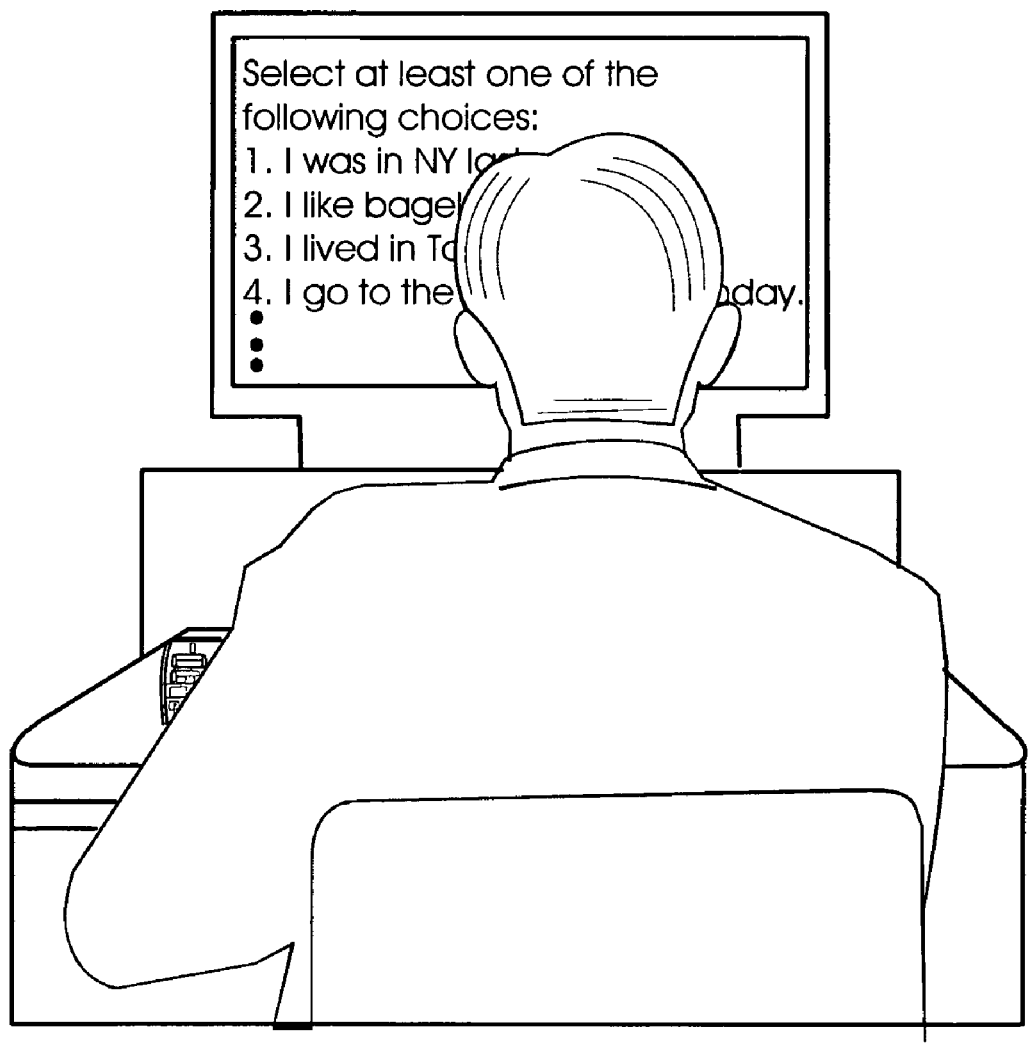
FIG. 5 is another exemplary implementation of the strategy-driven methodology of FIG. 3 in accordance with the present invention.

The preset choice(s) from the second option list may be in the form of dynamic and/or static statements, as described hereinabove in reference to FIGS. 3-5. The system requires the user to select at least one choice Pi from the second option list (step 78). After the user has selected at least one choice from the second option list, the system checks if the selected choice(s) is/are correct (step 80). If so, system access is granted (step 74). If not, the system is configured to request proof of user identity for the purpose of resetting the first and/or second option lists (step 82). The option list reset procedure may be conducted, for example, over the telephone with the user personally verifying critical personal information or via a fingerprint transmitting device that is operatively coupled to the system. Other means of resetting the option list(s) may be utilized, as needed. More than two option lists may be presented to the user, if desired.

Figure 7A:
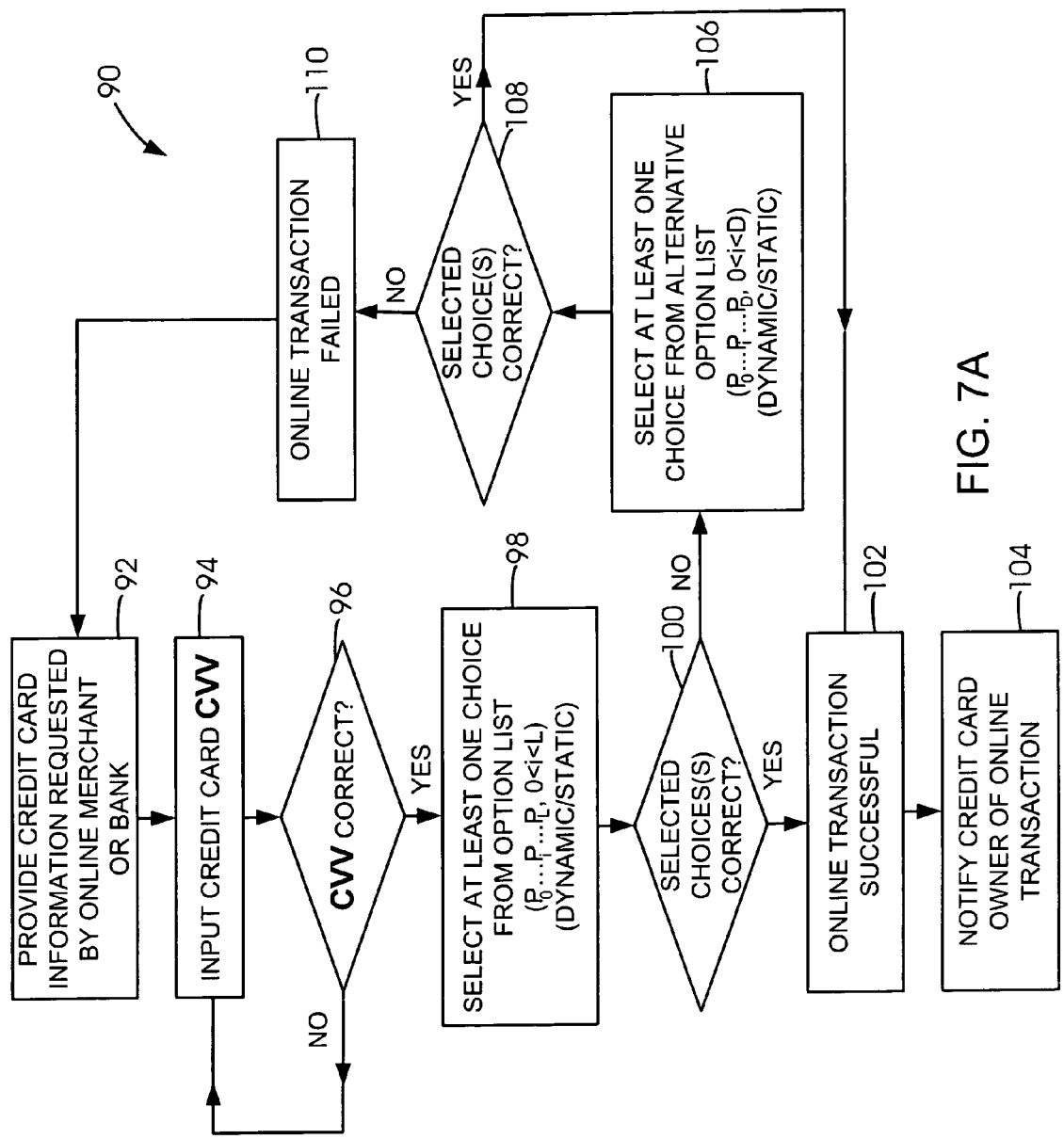
FIG. 7A is a flow chart of a method for reducing credit card transaction fraud in accordance with the present invention.

FIG. 7A is a flow chart of a method 90 for reducing credit card transaction fraud in accordance with the present invention. Credit card companies need to ensure that business transactions are being made by authorized users. A credit card is typically signed by the credit card owner in a pre-designated field usually on the back of the card as a form of identity verification. The credit card may have an embedded hologram to make the card somewhat difficult to forge. However, the hologram would be of little benefit if the card is lost or stolen.

Some credit cards add a PIN (Personal Identification Number) entry requirement every time the card is used at an ATM (Automated Teller Machine), merchant location or bank. However, this requires the credit card owner to remember the PIN at all times. If one or more customers fail to remember their respective credit card PINs in a store or bank setting, as normally happens, there would be a long line of disgruntled customers waiting their turn to process transactions.

When merchandise is ordered online, an online merchant or bank may request that the user provide credit card information (step 92). The term "online merchant" generally refers to a system or systems employed by a merchant entity for the purpose of soliciting, offering, accepting, and processing online transactions, such as made by credit cards, debit cards and the like. A variety of online merchants are currently being utilized on the Internet by various business entities including banks. After providing the requisite credit card number and expiration date, the online merchant or bank may request input of the credit card CVV (step 94). The CVV (Card Verification Value) is designed to provide an additional level of fraud protection. The CVV number is may be imprinted on the back of the credit card. The CVV number may be three to four digits long.

The online merchant or bank checks whether the input CVV is correct, i.e. whether it matches an authenticated CVV stored in its database (step 96). If the input CVV is incorrect (no match), the user would need to repeat step 94. If the input CVV is correct (i.e. it matches a stored authenticated CVV), the online merchant or bank is configured to present a list of choices or options $\{P_o \ldots P_i \ldots P_L, 0<i<L,$ where L is a finite number$\}$ to the user instead of granting system access, as normally practiced. The presented list may contain a mixture of randomly generated choices and one or more choices set in advance by the authorized (registered) user, i.e. the credit card owner. At least one of the preset choices $P_i$ would have been pre-designated as the correct choice by the credit card owner. Alternatively, the presented list may be entirely set in advance by the credit card owner with at least one choice $P_i$ being pre-designated as the correct choice.

The functionality of the online merchant or bank may be accomplished in software and/or hardware, as needed. The online merchant or bank requires that the user select at least one choice $P_i$ from the presented option list (step 98). The preset choices on the presented option list may be in the form of dynamic and/or static statements. After the user has selected at least one choice from the option list, the online merchant or bank checks if the selected choice(s) is/are correct (step 100). If so, online transaction is processed (step 102). The online merchant or bank may be optionally configured to notify the credit card owner of the processed online transaction (step 104). The notification may be performed in any suitable manner, e.g. by telephone, e-mail, fax, mail and/or the like.

If the selected choice(s) is/are incorrect, the online merchant or bank is adapted to present an alternative list of choices or options $\{P_o \ldots P_i \ldots P_D, 0<i<D,$ where D is a finite number$\}$ to the user. The alternative option list may also contain a mixture of randomly generated choices and one or more choices set in advance by the credit card owner. At least one of the preset choices $P_i$ would have been pre-designated as the correct choice by the credit card owner. The alternative option list may also be entirely set in advance by the credit card owner with at least one choice $P_i$ being pre-designated as the correct choice. The preset choices presented to the user may be in the form of dynamic and/or static statements, as desired.

The online merchant or bank requires that the user select at least one choice $P_i$ from the alternative option list (step 106). The online merchant or bank checks whether the selected choice(s) is/are correct (step 108). If so, the online credit card transaction is processed (step 102). If not, the online merchant or bank declines to process the credit card transaction, i.e. the online transaction has failed (step 110). In such case, the user may start the process all over again (step 92).

One advantage to the above-described credit card verification procedure is that users no longer have to change credit cards in case of lost or stolen cards, as the users are in control of credit card verification. An obvious result would be cost savings for merchants, banks and users alike. Even when a credit card is lost/stolen, the credit card owner and online merchant/bank need not worry about potential financial losses as a result of unauthorized online purchases. With no knowledge of the correct choice(s) on the presented option lists, an unauthorized user would be precluded from transacting any purchases on the stolen/lost card. This becomes quite important in view of the fact that the CVV imprinted on the front/back side of a stolen/lost credit card is readily available to the unauthorized user.

Figure 7B:
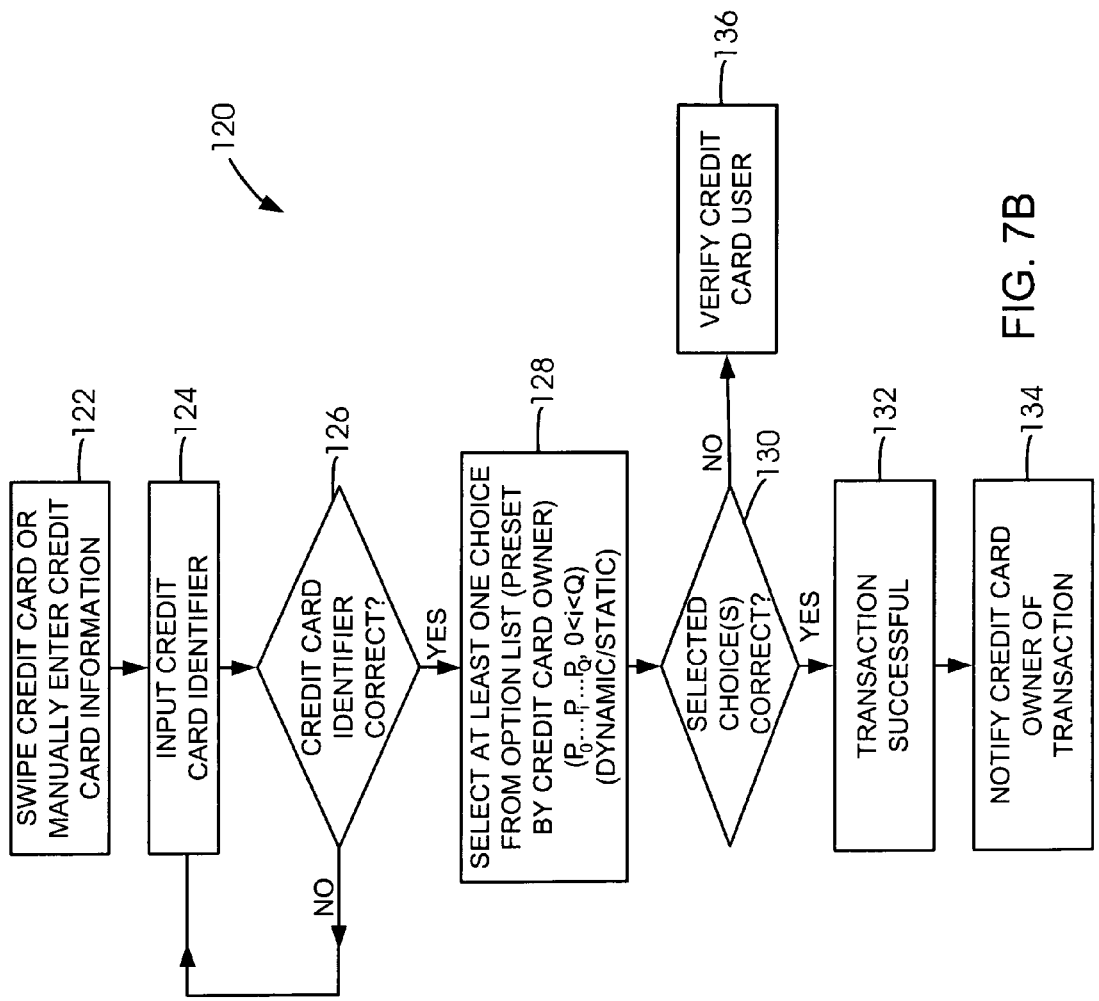
FIG. 7B is a flow chart of another method for reducing credit card transaction fraud in accordance with the present invention.

FIG. 7B is a flow chart of another method 120 for reducing credit card transaction fraud in accordance with the present invention. If a credit card user desires to purchase merchandise at a store location, for example, the store clerk may request that the user swipe his/her credit card via an appropriate system interface device (step 122). Alternatively, the credit card user may manually enter his/her credit card information via a credit card processing device. The card swipe automatically provides the credit card number and expiration date to the credit card processing system employed by the merchant. The merchant system may also request input of an appropriate credit card identifier (step 124) as an additional level of fraud protection. One commonly used credit card identifier is the postal zip code of the credit card owner. Other credit card identifiers may be utilized, needed. The merchant system checks whether the input credit card identifier is correct, i.e. whether it matches an authenticated credit card identifier stored in its database (step 126).

If the input credit card identifier is incorrect (no match), the user needs to repeat step 124. If the input credit card identifier is correct (there is a match), the merchant system is configured to present a list of choices or options $\{P_o \ldots P_i \ldots P_Q, 0<i<Q,$ where Q is a finite number$\}$ to the user instead of granting system access, as conventionally practiced. The entire list of choices has been set in advance by the credit card owner with at least one choice $P_i$ being pre-designated as the correct choice(s) by the authenticated user. Particularly, the credit card owner would have preset correct and incorrect choices or options via an appropriate system interface. The various choices on the presented option list may be in the form of statements. The presented statements may be dynamic and/or static, as described hereinabove in reference to FIGS. 3-5.

A person skilled in the art would recognize that the presented option list may alternatively contain a mixture of randomly generated choices and one or more choices set in advance by the credit card owner, whereby at least one of the preset choices $P_i$ would have been pre-designated as the correct choice by the credit card owner. The functionality of the merchant system may be accomplished in software and/or hardware, as desired.

To proceed with his/her transaction, the user would have to select at least one choice $P_i$ from the presented option list (step 128). The merchant system checks if the selected choice(s) is/are correct (step 130). If so, the desired transaction is processed (step 132). The term "transaction" in this case may refer to merchandise orders/purchases/returns at a store, via fax, telephone and/or the like. The merchant system may be optionally configured to notify the credit card owner of the processed transaction (step 134). The notification may be performed in any suitable manner, e.g. by telephone, e-mail, fax, mail and/or the like.

If the selected choice(s) is/are incorrect, the merchant system is programmed to verify the credit card user (step 136). Particularly, a merchant clerk may request verbally that the user identify himself/herself via two or more pieces of identification, fingerprint scan, iris scan, etc.

An alternative implementation of the above-described method for reducing credit card transaction fraud may involve the use of a contactless credit card. If a contactless credit card user has picked merchandise for purchase at a store location, the store clerk may request that the user wave the card in proximity to a contactless credit card processing system device employed by the store. If the contactless credit card input is incorrect (i.e. it does not match a corresponding entry in a system database used by the store), the system does not process further the transaction. In such case, the contactless credit card user may wave the card again in an attempt to proceed with the merchandise purchase, if desired.

If the contactless credit card input is correct (i.e. it matches a corresponding entry in a system database used by the store), the system is configured to present a list of choices or options $\{P_o \ldots P_i \ldots P_Z, 0<i<Z,$ where Z is a finite number$\}$ to the user instead of granting system access, as conventionally practiced. The entire list of choices has been set in advance by the credit card owner with at least one choice $P_i$ being pre-designated as the correct choice(s) by the authenticated user. Particularly, the contactless credit card owner would have preset correct and incorrect choices or options via an appropriate system interface. The various choices on the presented option list may be in the form of statements. The presented statements may be dynamic and/or static, as described hereinabove in reference to FIGS. 3-5.

A person skilled in the art would recognize that the presented option list may alternatively contain a mixture of randomly generated choices and one or more choices set in advance by the contactless credit card owner, whereby at least one of the preset choices $P_i$ would have been pre-designated as the correct choice by the credit card owner. The functionality of the contactless credit card processing system may be accomplished in software and/or hardware form, as desired.

To proceed with his/her transaction, the user would have to select at least one choice $P_i$ from the presented option list. The system checks whether the selected choice(s) is/are accurate.

If so, the desired transaction is processed. The system may be optionally configured to notify the contactless credit card owner of the processed transaction. The notification may be performed in any suitable manner, e.g. by telephone, e-mail, fax, mail and/or the like.

If the selected choice(s) is/are inaccurate, the system is programmed to verify the identity of the contactless credit card user. Particularly, a store clerk may request verbally that the user identify himself/herself via two or more pieces of identification, fingerprint scan, iris scan, etc.

Figure 8A:
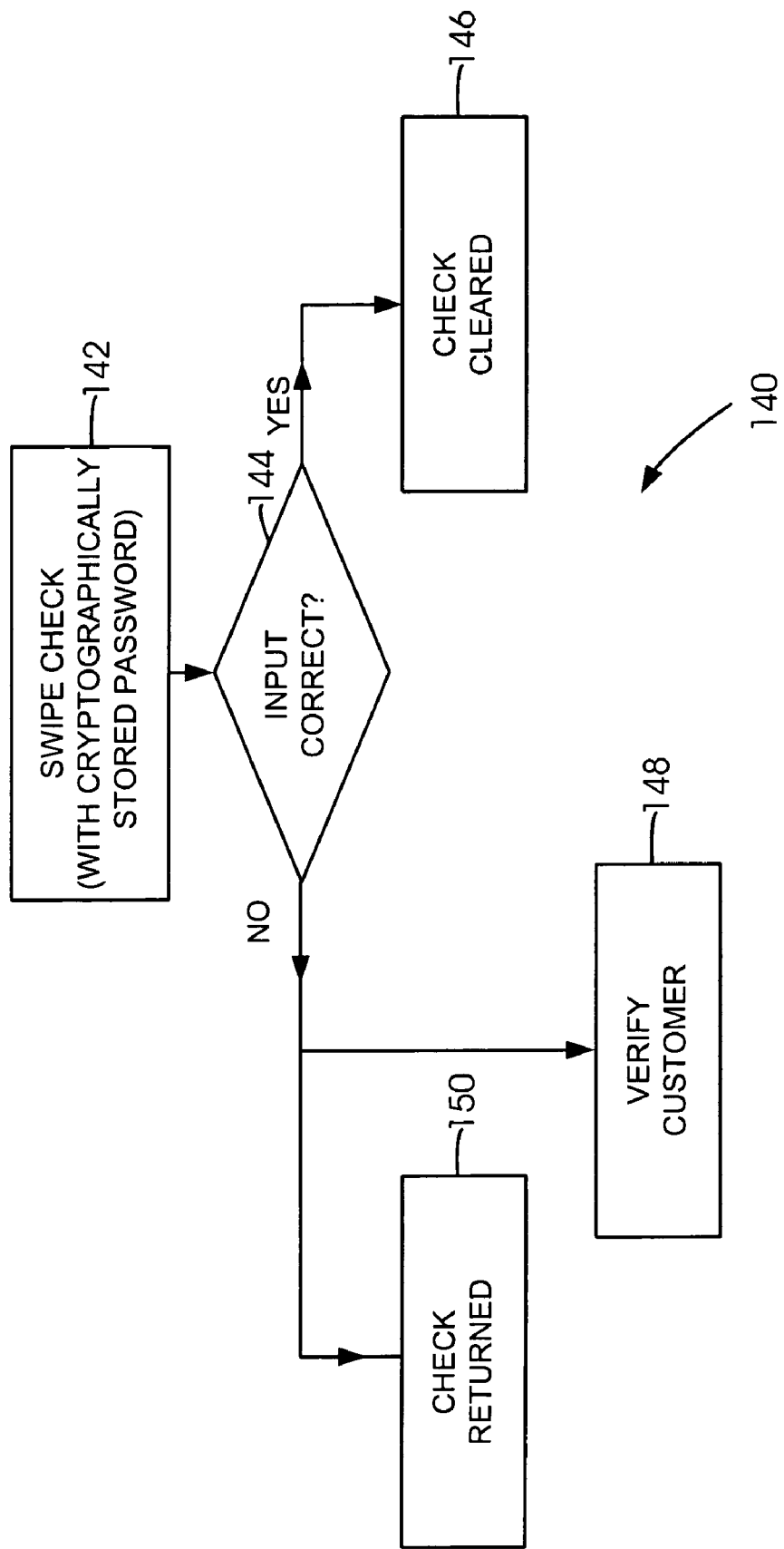
FIG. 8A is a flow chart of a method for reducing checking transaction fraud in accordance with the present invention.

FIG. 8A is a flow chart of a method 140 for reducing checking transaction fraud in accordance with the present invention. If a customer is at a bank or check cashing location or desires to pay for merchandise in a store with a check, the business entity may request that the user swipe his/her check (step 142) via an appropriate check processing system interface device. The check contains a cryptographically stored password on its face or back, or both, as needed. For example, the password may be cryptographically stored in the form of a bar code, an alphanumeric sequence, an image, a pattern, an embedded IC (Integrated Circuit) chip and/or the like.

A person skilled in the art would appreciate that more than one password may be cryptographically stored on the check, as needed. The stored password(s) may be made visible or invisible, as needed. An invisible password may be read by various devices such as a UV (Ultra-Violet) or infra-red scanners. Checking account owners may be provided by their banks or credit unions with devices capable of printing or embedding cryptographically stored passwords on checks.

The check swipe provides checking account number and owner's name(s) to the check processing system used by the business entity. The check swipe also provides information on the cryptographically stored password. The system is configured to read (decrypt) the password that is stored on the check and check the decrypted password against its database of stored passwords. Stored passwords have been set in advance by respective checking account owners. The system checks whether the input check data is correct (step 144) by utilizing appropriate databases. If so, the check is cleared (step 146). If not, the system may be configured to verify the identity of the customer (step 148) and/or return the check to the customer (step 150).

This setup does not require direct communication with the customer, and allows for a change in password every time the customer orders a new batch of checks from the bank. Since the stored password is encrypted, no one can read it except for an appropriately configured system interface at a merchant or bank location. This setup provides reliable and secure check processing that may be implemented at a relatively low cost to the bank and/or bank customers.

Figure 8B:
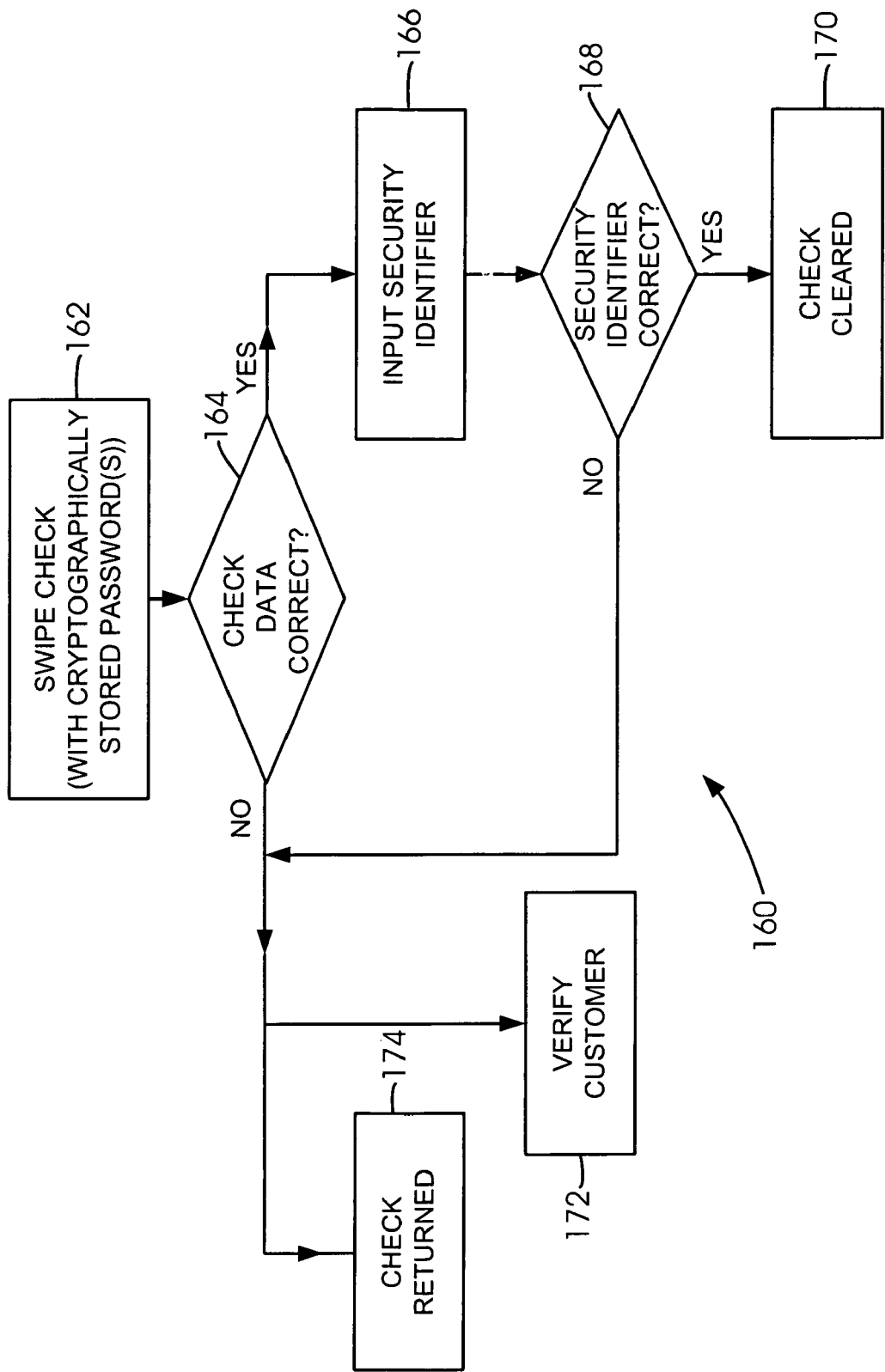
FIG. 8B is a flow chart of another method for reducing checking transaction fraud in accordance with the present invention.

FIG. 8B is a flow chart of another method 160 for reducing checking transaction fraud in accordance with the present invention. Again, if a customer is at a bank or check cashing location or desires to pay for merchandise in a store with a check, the business entity may request that the user swipe his/her check (step 162) via an appropriate check processing system interface device. The check contains at least one password that is cryptographically stored on the face or back of the check, or on both sides of the check, as needed. The check swipe provides checking account number, checking account owner's name(s) and information on the cryptographically stored password(s) to the check processing system utilized by the business entity.

The system is configured to read (decrypt) the password(s) stored on the check and check the decrypted password(s) against its own database of stored passwords. The system checks whether the input check data is correct (step 164) by utilizing appropriate databases. If so, the system requires the user to input a security identifier (step 166) which has been preset by the checking account owner. The security identifier may be in the form of a password, statement or the like. This setup advantageously enhances security as it provides a second layer of check user verification.

The system checks whether the input security identifier is correct (step 168) by utilizing its database of stored security identifiers. If so, the check is cleared (step 170). If not, the system may be set up to verify the identity of the customer (step 172) and/or return the check to the customer (step 174).

This setup also allows for a change in password every time the customer orders a new batch of checks from the bank. Again, since the stored password(s) is/are encrypted, no one can read the same except for an appropriately configured system interface at a merchant or bank location. This setup, however, requires direct communication with the customer, as in step 166, to enhance security and help prevent bad checks from going through.

Figure 8C:
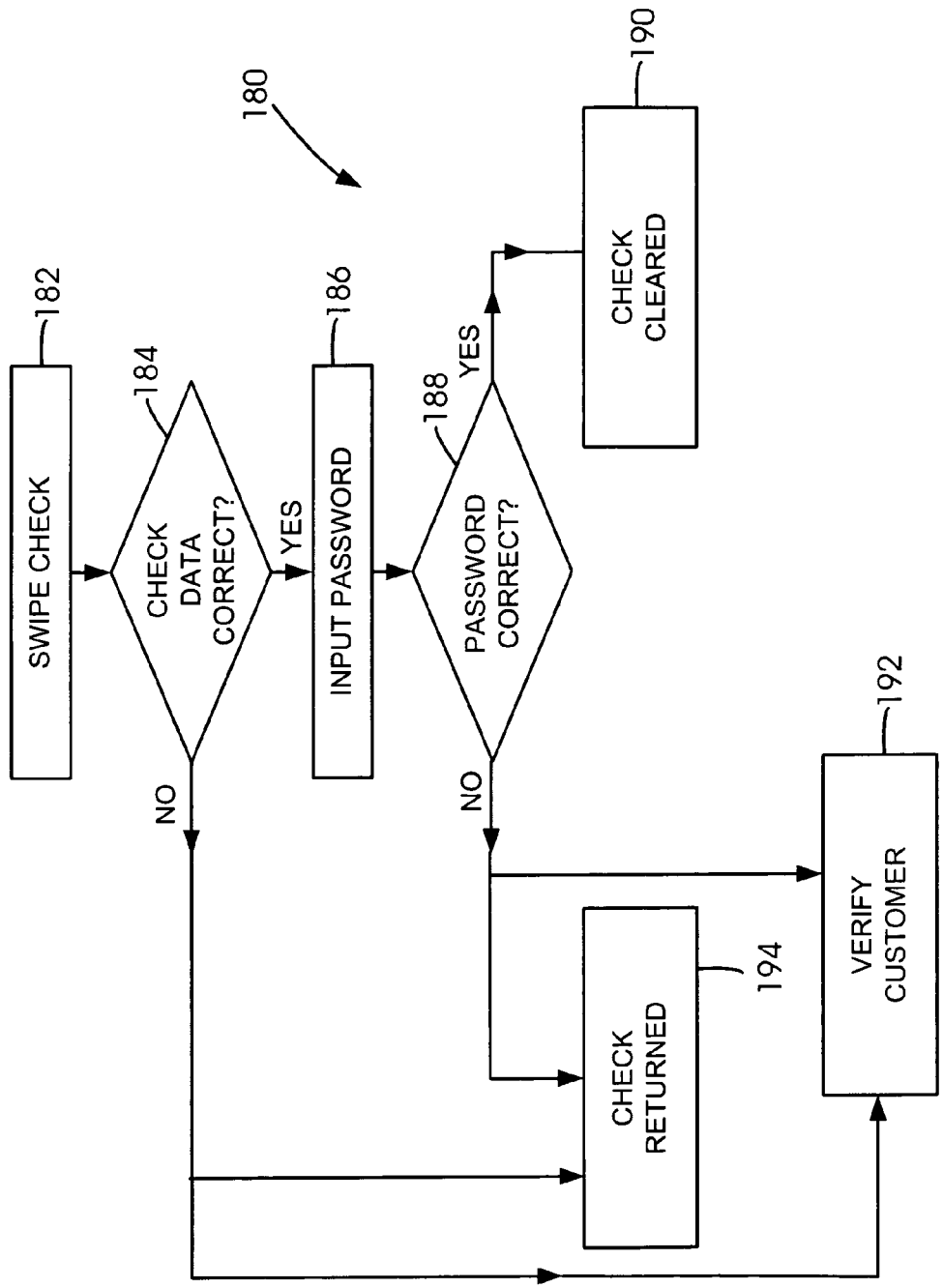
FIG. 8C is a flow chart of yet another method for reducing checking transaction fraud in accordance with the present invention.

FIG. 8C is a flow chart of yet another method 180 for reducing checking transaction fraud in accordance with the present. If a customer is at a bank or check cashing location or desires to pay for merchandise in a store with a check, the business entity may request that the user swipe his/her check (step 182) via an appropriate check processing system interface device. The check processing system checks whether the swiped (input) check data is correct (step 184) by utilizing appropriate database(s). The swiped (input) check data contains checking account number and owner information. The check does not contain a cryptographically stored password, as generally described hereinabove in reference to FIG. 8A-8B. If the input check data is not correct, the system is programmed to verify the identity of the customer (step 192) and/or return the check to the customer (step 194).

If the input check data is correct, the system requires the user to input a password (step 186) which has been preset by the checking account owner. Alternatively, the user may be required to pick one password from a password option list (not shown) that has also been preset by the checking account owner. This option list would contain at least one correct choice (password) that has been set in advance by the checking account owner. The option list may also be randomly generated in part by the system. In such case, the option list should contain at least one correct choice (password) that has been set in advance by the checking account owner.

The system checks whether the input password is correct (step 188) by utilizing its database of stored passwords. If so, the check is cleared (step 190). If not, the system may verify the identity of the customer (step 192) and/or return the check to the customer (step 194). This setup also requires direct communication with the user to enhance security and help prevent bad checks from going through.

Figure 8D:
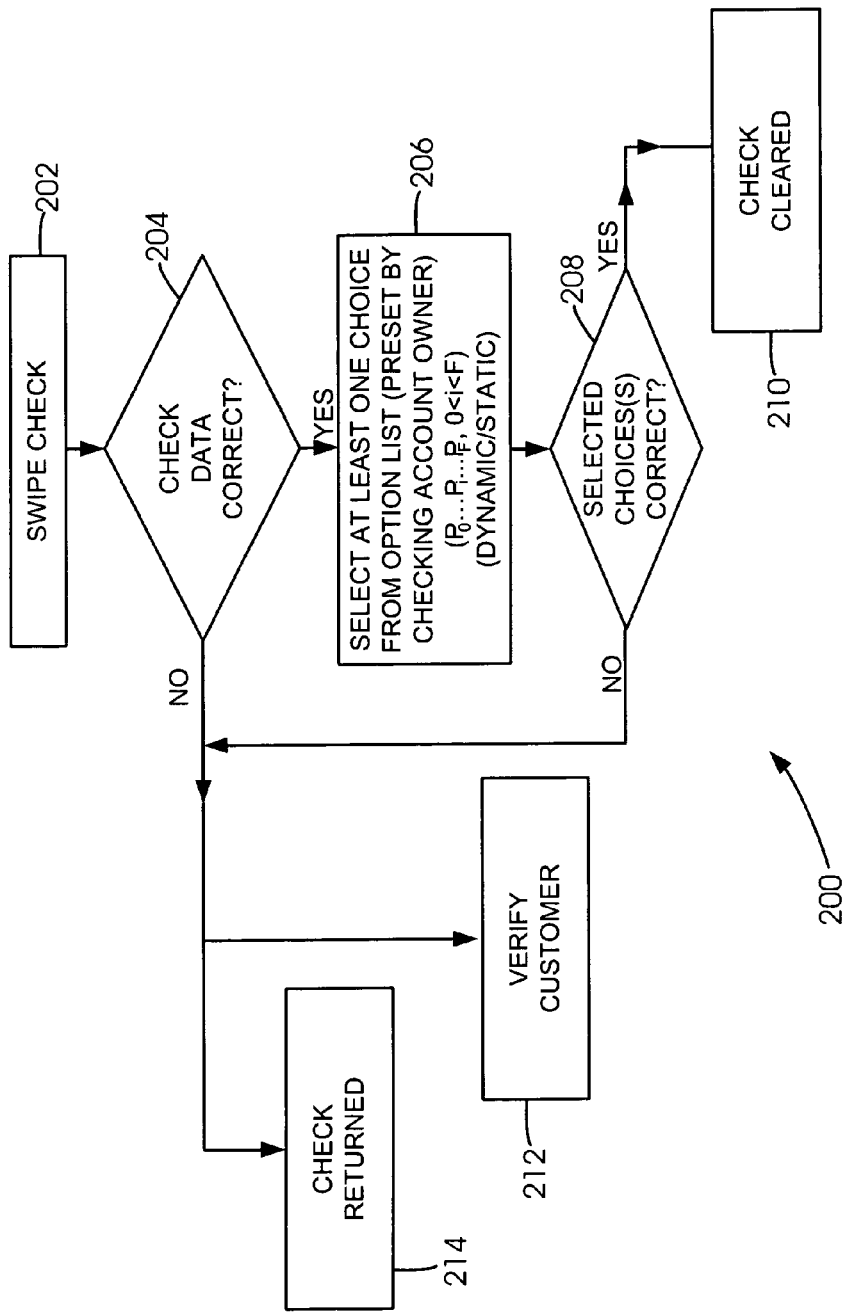
FIG. 8D is a flow chart of still another method for reducing checking transaction fraud in accordance with the present invention.

FIG. 8D is a flow chart of still another method 200 for reducing checking transaction fraud in accordance with the present invention. If a customer is at a bank or check cashing location or desires to pay for merchandise in a store with a check, the business entity may request that the user swipe his/her check (step 202) via an appropriate check processing system interface device. The check processing system employed by the business entity checks whether the swiped (input) check data is correct (step 204) by utilizing its database of stored checking account data. If not correct, the check processing system is configured to verify the identity of the customer (step 212) and/or return the check to the customer (step 214).

If correct, the system is configured to present a list of choices $\{P_o \ldots P_i \ldots P_F, 0<i<F,$ where F is a finite number$\}$ to the user instead of clearing the check. This type of system functionality may be implemented in software and/or hardware form, as desired. Specifically, the system demands that the user select at least one choice $P_i$ from the presented option list (step 206). The various choices on the presented option list have been preset in advance by the checking account owner, and may be in the form of statements. The presented statements may be dynamic and/or static, as described hereinabove in reference to FIGS. 3-5. At least one of the presented statements would have been set in advance by the checking account owner to be the correct choice(s).

After the user has selected at least one choice from the option list, the system checks whether the selected choice(s) is/are correct (step 208) by utilizing its database of stored statements (preset by respective checking account owners). If so, the check is cleared (step 210). If not, the system verifies the identity of the customer (step 212) and/or returns the check to the customer (step 214), as schematically shown in FIG. 8D.

Figure 8E:
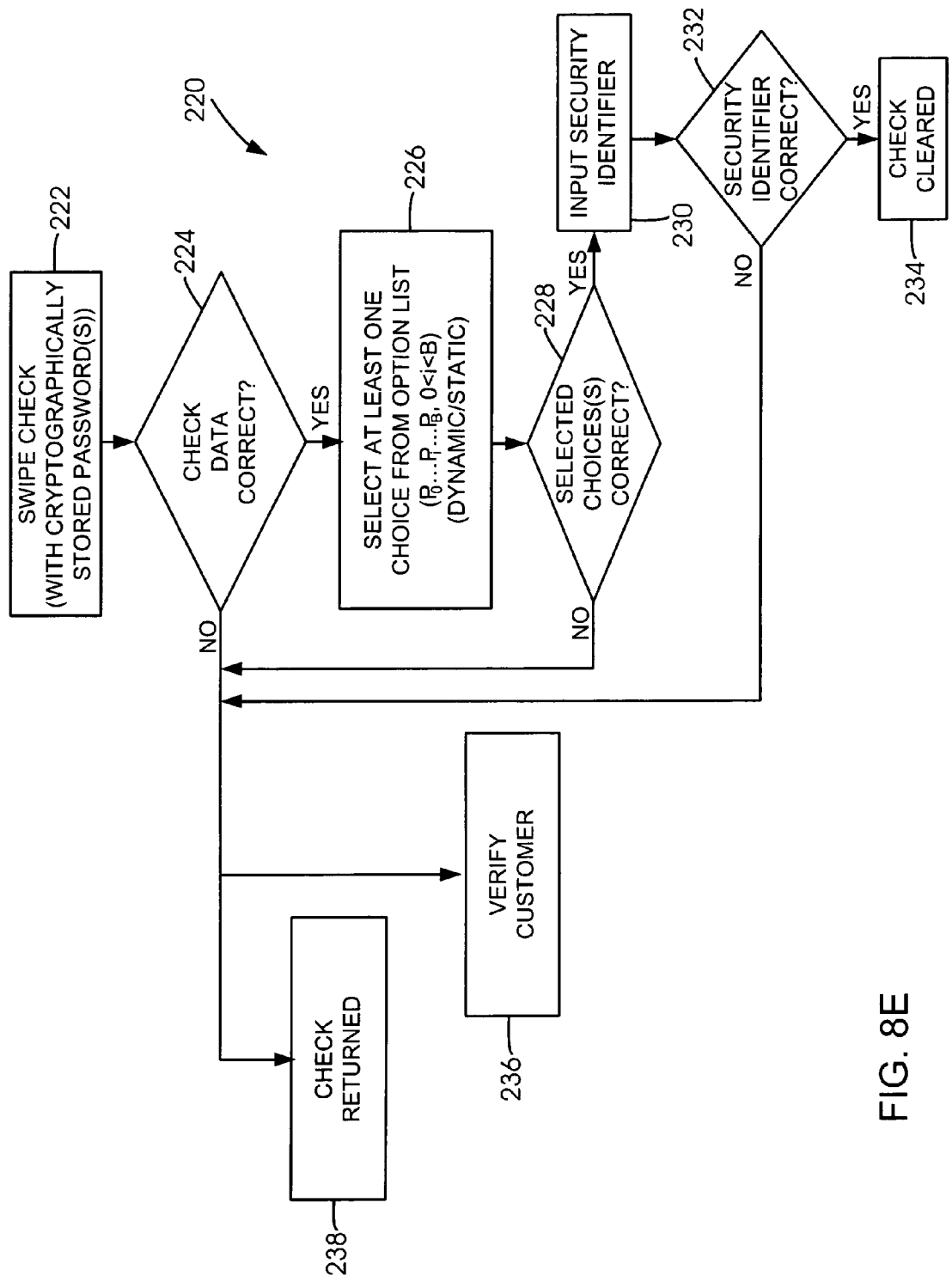
FIG. 8E is a flow chart of an alternative method for reducing checking transaction fraud in accordance with the present invention.

FIG. 8E is a flow chart of an alternative method 220 for reducing checking transaction fraud in accordance with the present invention. If a customer desires to use a check as payment, the business entity may require that the customer swipe his/her check (step 222) via an appropriate check processing system interface device. The check contains at least one password that is cryptographically stored on the face or back of the check, or on both sides of the check, as needed. The check swipe provides checking account number, checking account owner's name(s), and information on the cryptographically stored password(s) to the check processing system used by the business entity.

The check processing system is configured to read (decrypt) the password(s) stored on the check and check the decrypted password(s) against its database of stored check passwords. Stored passwords have been set in advance by respective checking account owners. The system checks whether the input check data is correct (step 224) by utilizing appropriate databases. The input check data contains information on checking account number, owner's name(s) and decrypted check password(s). If the input data is not correct, the check processing system is configured to verify the identity of the customer (step 236) and/or return the check to the customer (step 238).

If the input check data is correct, the check processing system is further configured to present a list of choices $\{P_o \ldots P_i \ldots P_B, 0<i<B$, where B is a finite number$\}$ to the user. This type of system functionality may be implemented in software and/or hardware form, as desired. Specifically, the check processing system requests that the user select at least one choice $P_i$ from the presented option list (step 226). The various choices on the option list are preset in advance by the checking account owner, and may be in the form of statements. The presented statements may be dynamic and/or static, as described hereinabove in reference to FIGS. 3-5. One or more of the presented dynamic/static statement(s) would have been set in advance by the checking account owner to be the correct choice(s). Alternatively, the option list may be randomly generated in part by the system itself. In such case, the option list should contain at least one correct choice in the form of dynamic/static statement(s) that have been set in advance by the checking account owner. The system compiles the option list from the randomly generated choices and one or more of the preset choices.

After the customer has selected at least one choice from the option list, the system checks whether the selected choice(s) is/are correct (step 228) by comparing the same against its database of stored "correct" statements that have been preset by respective checking account owners. If so, the system requires the user to input a security identifier (step 230) which has also been preset by the checking account owner. The security identifier may be generally in the form of a password, statement or the like. In one embodiment, the security identifier is the postal (zip) code of the checking account owner.

The check processing system checks whether the input second identifier is correct (step 232) by comparing the same against its database of stored security identifiers. If correct, the check is cleared (step 234). If not correct, the check processing system verifies the identity of the customer (step 236) and/or returns the check to the customer (step 238).

Figure 8F:
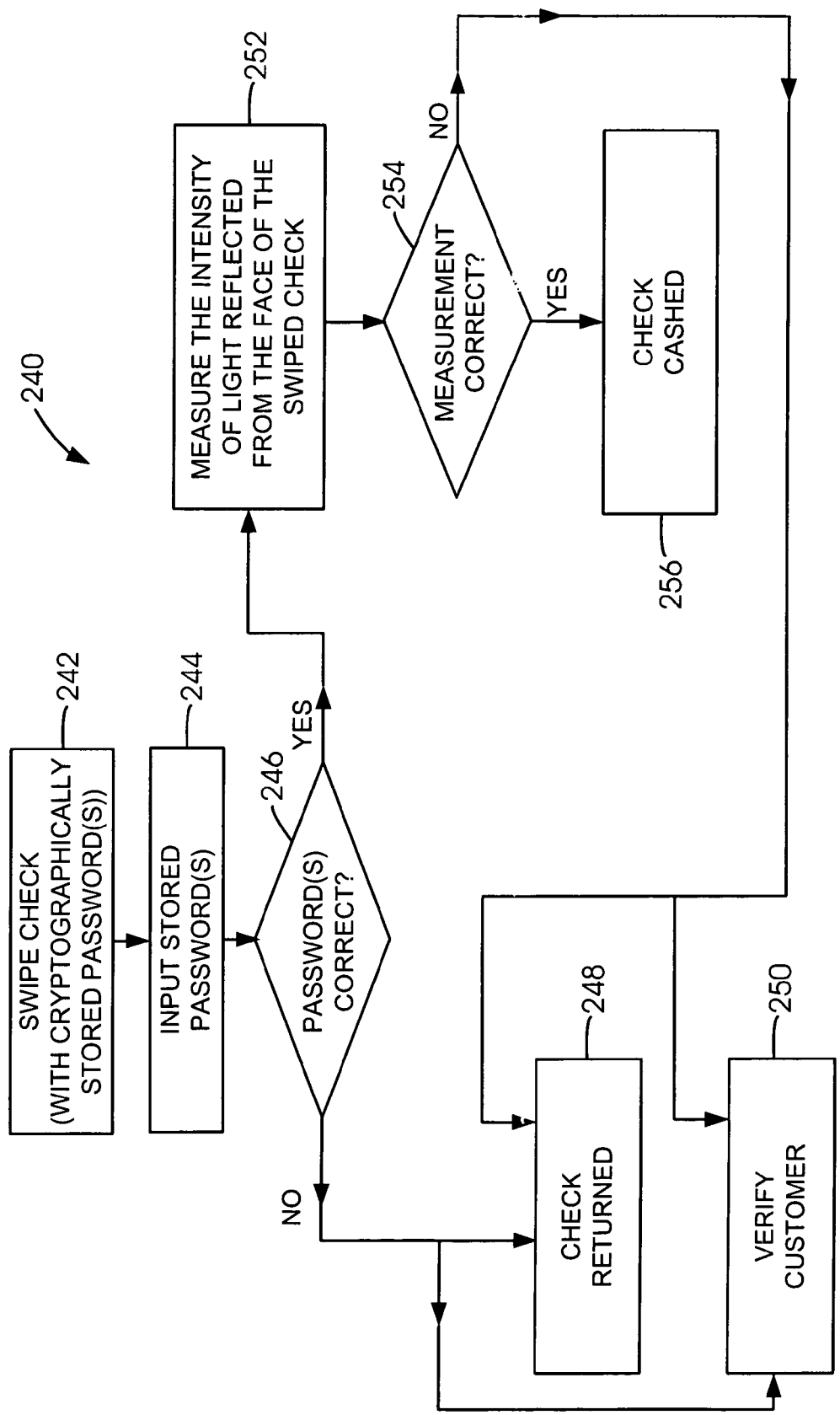
FIG. 8F is a flow chart of another alternative method for reducing checking transaction fraud in accordance with the present invention.

FIG. 8F is a flow chart of another alternative method 240 for reducing checking transaction fraud in accordance with the present invention. If a customer desires to cash a check at a check cashing terminal that is not able to communicate with the customer's bank, the check cashing terminal may require that the customer swipe his/her check (step 242) via an appropriate check processing interface device. The check contains at least one password that is cryptographically stored on the face or back of the check, or on both sides of the check, as needed. The check swipe provides checking account number, checking account owner's name(s) and information on the cryptographically stored password(s) to the check cashing terminal. Stored password(s) is/are preset by the checking account owner(s).

The check cashing terminal is adapted to decrypt (read) the password(s) stored on the check. However, the check cashing terminal cannot verify the decrypted password(s) since it is not able to communicate with the checking account owner's bank. In such case, the check cashing terminal requests that the customer manually input the password(s) that is/are cryptographically stored on the check (step 244) for verification. The customer complies with the request, and the check cashing terminal checks the input password(s) against the password(s) it has decrypted to verify the same (step 246). If there is no match, the check cashing terminal returns the check (step 248) to the customer, and/or verifies the customer (step 250). Specifically, the check cashing terminal may request that the customer provide personal identification information via a fingerprint scan, iris scan, swipe his/her driver's license, alert store personnel, and/or the like.

If there is a match, the check cashing terminal is configured to measure the intensity of light reflected from the face of the swiped check (step 252), and compare the measurement against its internal database of preset light reflection intensities for checks issued by known banking institutions (step 254). If the measured intensity is correct, i.e. there is a match against an entry in the database, the check is cashed (step 256). If the measured intensity is not correct, i.e. it does not match an entry in the database, the check cashing terminal returns the check (step 248) to the customer, and/or verifies the customer (step 250) in the manner generally outlined hereinabove.

This setup provides several layers of check cashing security (identity verification) to help prevent bad checks from being cashed or good checks from being cashed by unauthorized users. Additional layers of identity verification during a check cashing transaction may be utilized, as disclosed hereinabove, if needed.

Figure 9:
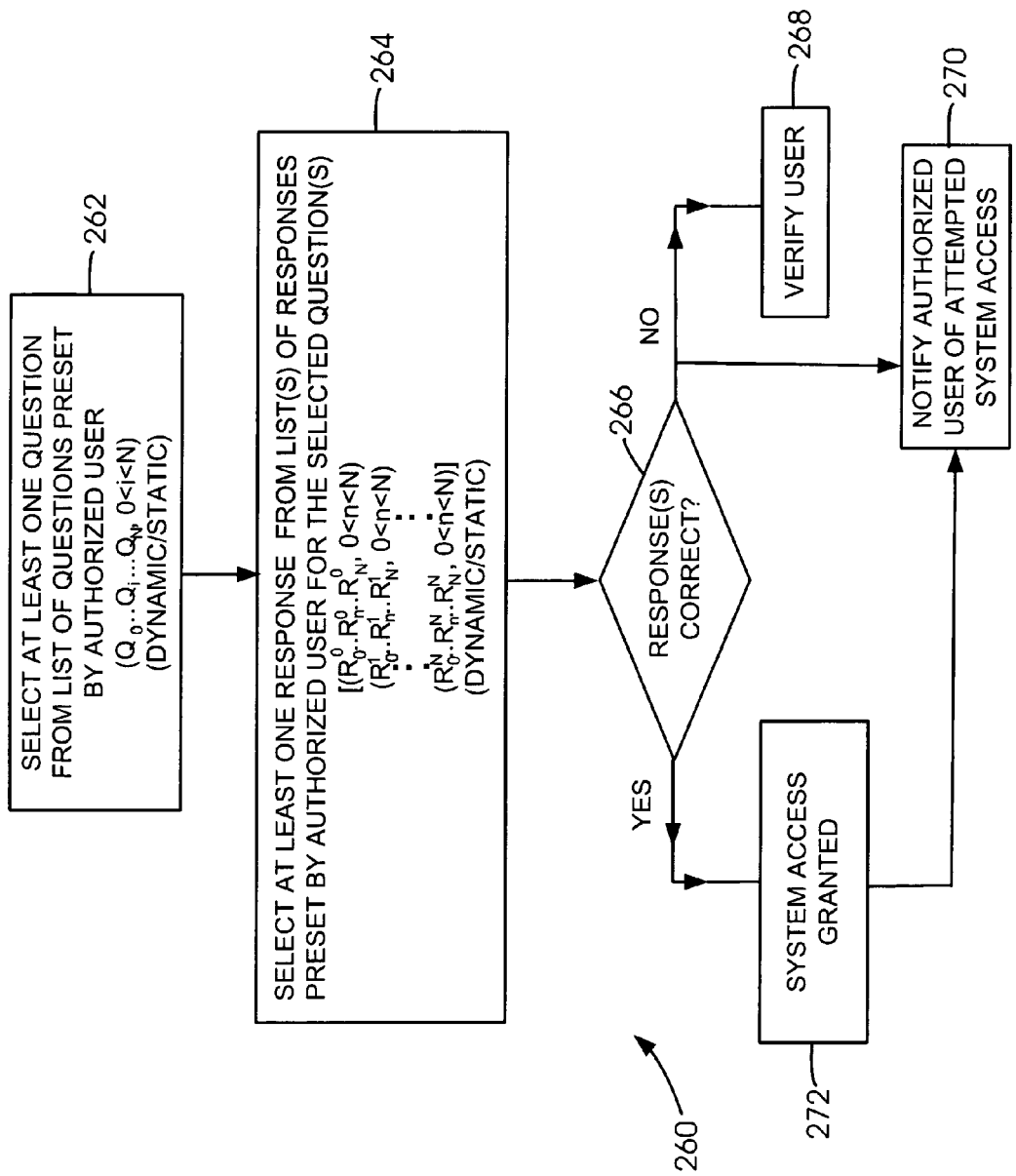
FIG. 9 is a flow chart of a secure system access method in accordance with the present invention.

FIG. 9 is a flow chart of a secure system access method 260 in accordance with the present invention. Particularly, a system user that has completed the initial login procedure (i.e. following the "user name" and "password" stages) may encounter a system request to select at least one question $Q_i$ from a list of questions $\{Q_o \ldots Q_i \ldots Q_N, 0<i<N$, where N is a finite number$\}$ presented by the system (step 262). All questions on the list have been set in advance by an authorized user according to his/her personal preference. Alternatively, some of the questions on the list may be randomly generated by the system (not shown). At least one question on the list would have been pre-designated by the authorized user as being the "correct" question.

For instance, the system may inquire about a favorite number, hobby, birth day, last year's trip, social security number, etc. The system may present one or more associated responses for each question. All responses (FIG. 9) to questions on the list have also been set in advance by an authorized user. At least one response $R_i^j$ to the correct question(s) would have been pre-designated by the authorized user as being the "correct" response. The presented questions and responses may be dynamic/static in the manner generally described hereinabove in reference to FIGS. 3-5. An example follows herein below:

| Question 1. What is your Social Security Number? | |
|---|---|
| Response 1. | 19826512 |
| Response 2. | 19826517 |
| Response 3. | 39826515 |
| Response 4. | 49826512 |
| Question 2. What is your date of birth? | |
| Response 1. | Jul. 19, 1965 |
| Response 2. | Sep. 19, 1965 |
| Response 3. | Sep. 19, 1963 |
| Response 4. | Jul. 19, 1966 |
| Question 3. Where did you last visit? | |
| Response 1. | I visited my grandma in Washington, D.C. |
| Response 2. | I visited the White House. |
| Response 3. | I visited a high school friend who is a lawyer. |
| Response 4. | I visited my cousin in Washington. |
| Question 4. What is your lucky number this month? | |
| Response 1. | 34 |
| Response 2. | 23 |
| Response 3. | 12 |
| Response 4. | 11 |

For example, Question 4 may have been set up as a dynamic question by the authorized user. Particularly, the portion "this month" may be intended to refer to "this month plus 3 months." In such case, if "this month" is February, the question is actually asking for a lucky number not in February, but in May. Unauthorized users would probably not pick Question 4 as the correct question. It seems counterintuitive to expect that the question would be asking for a lucky number in the month of May when the current month is February. Even if Question 4 is accidentally picked by an unauthorized user as the "correct" question, it is unlikely that the unauthorized user would pick the correct response (lucky number) for "this month," since the response should be valid for May, not February. Even if the unauthorized user knows what the lucky number for February is supposed to be, let's say "23" (Response 2), selecting Response 2 would not be a "correct" response, since the lucky number for the month of May may have been preset by the authorized user to be "11" (Response 4).

Questions 1-3 may have been set in advance as static questions by the authorized user. However, one or more of the responses to Questions 1-3 may have been preset as dynamic response(s) by the authorized user. For example, "19826517" (Response 2 to Question 1) may have been preset such that the first digit of the listed social security number dynamically refers to the current day of the week with all of the remaining digits being part of the actual social security number of the authorized user. In other words, the first digit would dynamically change depending on the day of the week. If today is Monday, Response 2 to Question 1 would be listed by the system as "19826517" while the actual social security number of the authorized user may be "998-26-517."

Having selected at least one presumably correct question, the user is required to select at least one response from the respective list(s) of responses for the selected question(s) (step 264). The system is configured to check the selected question(s) and response(s) against appropriate databases (step 266) to determine if the same are in fact correct. If correct, system access is granted (step 272), and the system may notify the authorized user of the granted system access (step 270). If not correct, system access is denied. The system may attempt to verify the user (step 268), and/or optionally notify the authorized user of the attempted system access (step 270). Notification may be via e-mail, fax, automated telephone call, mail, etc. User verification may involve requesting additional identification papers, the requirement for fingerprint scan, iris scan, DNA profile input via CD (Compact Disc), etc.

DNA (Deoxyribonucleic acid) profile may be generally defined as the distinctive pattern of DNA restriction fragments or PCR products that can be used to identify, with great certainty, any person, biological sample from a person, or organism from the environment. Polymerase Chain Reaction (PCR) is a technique to amplify a specific DNA sequence in vitro using a DNA replicating enzyme, specific oligonucleotide primers, and repeated cycles of heating and cooling.

Figure 10A:
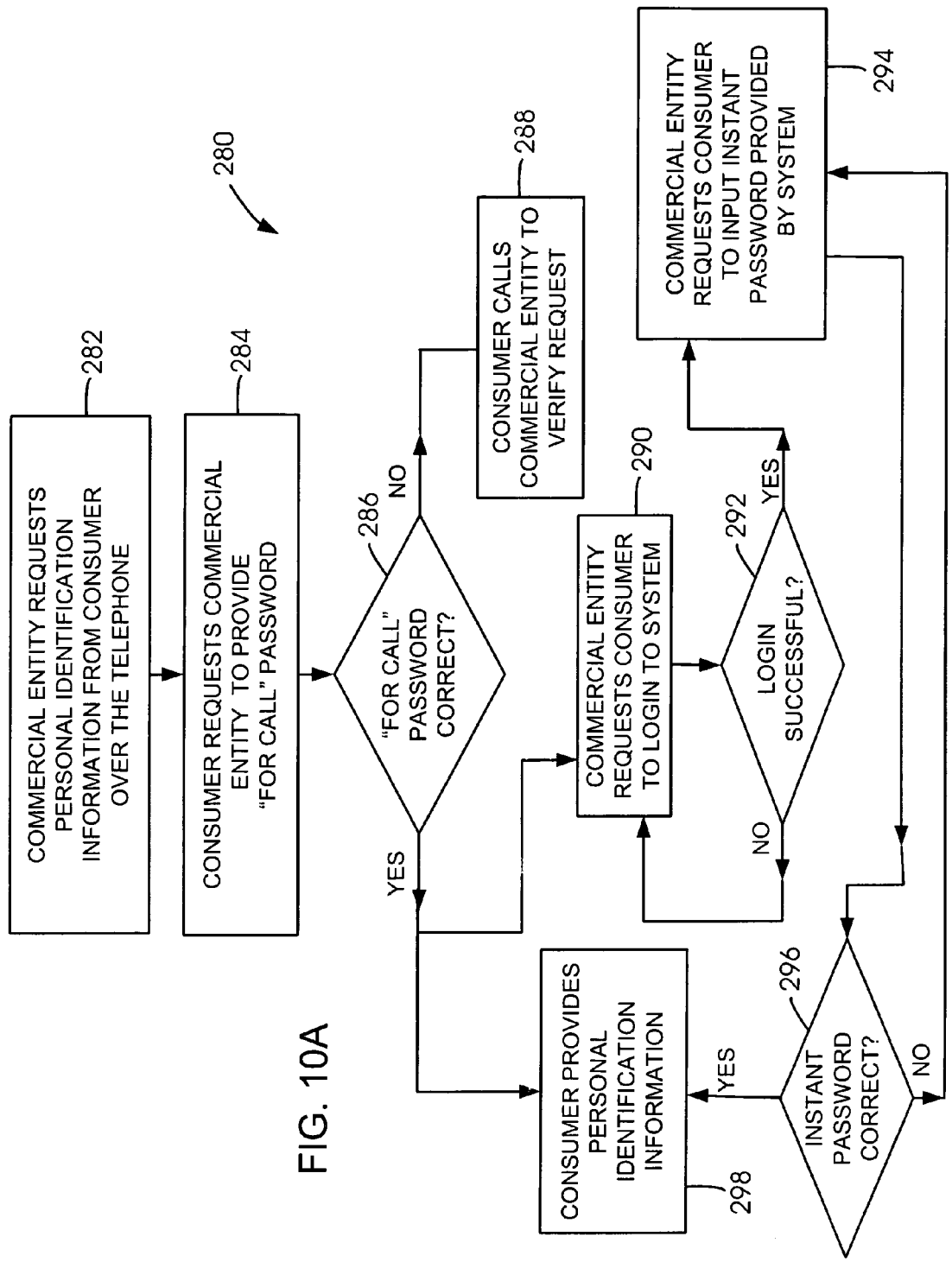
FIG. 10A is a flow chart of a method for securely providing personal identification information in accordance with the present invention.

FIG. 10A is a flow chart of a method 280 for securely providing personal identification information in accordance with the present invention. A commercial entity may desire to communicate with an authorized account holder (consumer) via the telephone. A telephone connection is established, and the commercial entity requests personal identification information from the consumer (step 282) over the telephone. The consumer, however, may not be certain at this point whether the call is legitimate, i.e. whether the voice on the other end of the telephone line actually belongs to a representative of the commercial entity. To eliminate such uncertainty, an authorized account holder may have set up a "for call" password in advance with the commercial entity. A "for call" password is to be provided by the commercial entity representative to the authorized account holder during telephone communication(s) to verify that the call is actually being placed by the commercial entity.

To proceed along these lines, the consumer requests over the telephone that the commercial entity provide the "for call" password (step 284). The consumer checks whether the provided "for call" password is correct (step 286). The consumer may remember such password or may consult his/her records regarding the same. If the provided password is incorrect, the consumer may disconnect the call and attempt to contact the commercial entity holding his/her account personally to verify the communication request (step 288).

If the provided password is correct, the consumer may provide personal identification information over the telephone (step 298). An alternative approach in the same instance would be for the commercial entity to request that the consumer attempt to login to the system (step 290) maintained by the commercial entity. The system maintained by the commercial entity checks whether the attempted login is successful (step 292). If so, the commercial entity may request that the consumer input an instant password that has just been provided by the system (step 294). An instant password may be also provided by the commercial entity representative over the telephone. The provision of an instant password is intended as an additional layer of consumer verification. The system checks whether the input instant password is correct (step 296). If correct, the consumer may provide personal identification information to the commercial entity representative (step 298) over the telephone. If not correct, the consumer may decline to provide the requested personal identification information over the telephone. In such case, the consumer would need to repeat step 294, as shown in FIG. 10A.

Figure 10B:
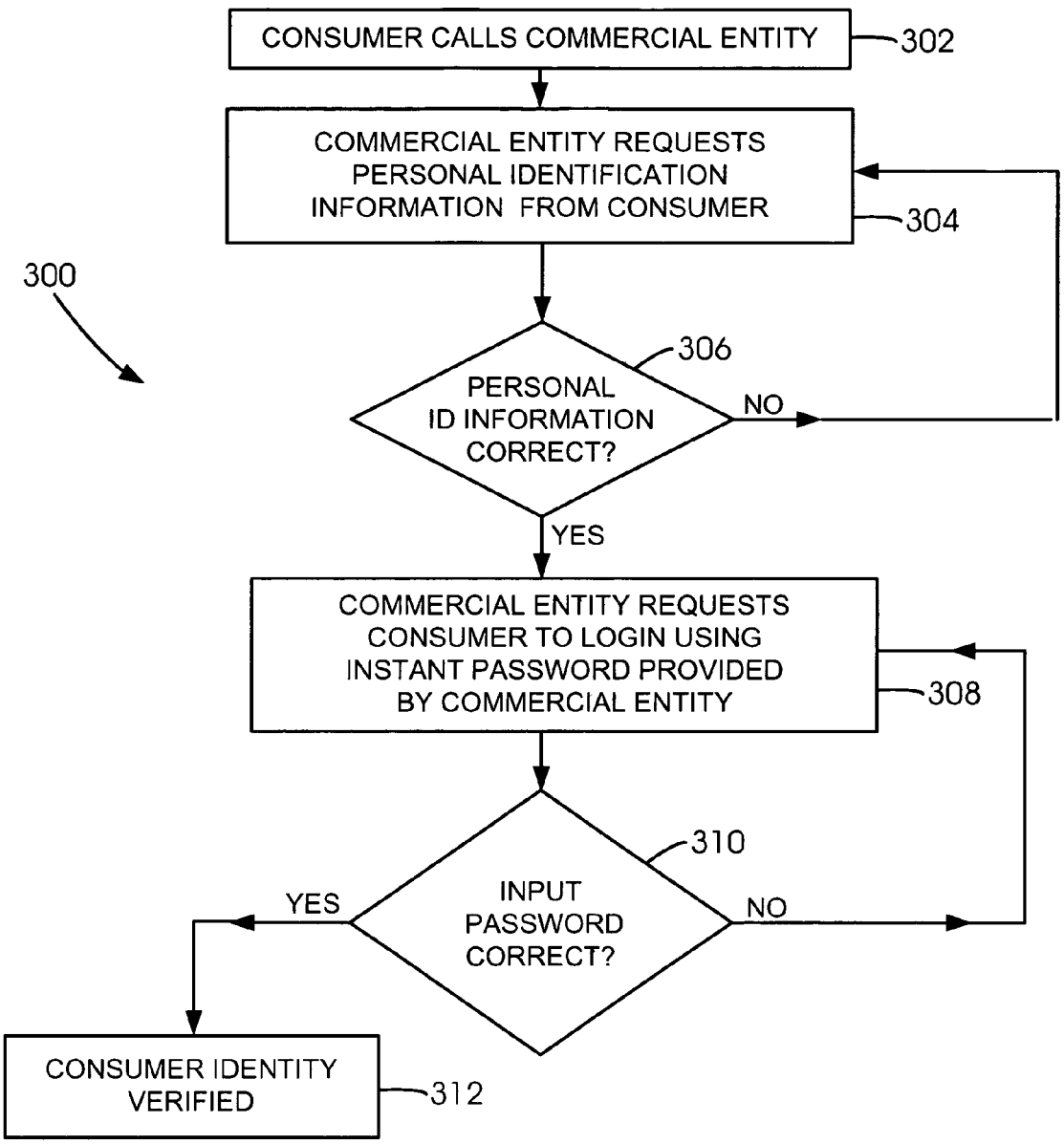
FIG. 10B is a flow chart of another method for securely providing personal identification information in accordance with the present invention.

FIG. 10B is a flow chart of another method 300 for securely providing personal identification information in accordance with the present invention. In this case, it is the consumer calling a commercial entity (step 302) in an attempt to inquire on his/her account that is being held by the commercial entity. A commercial entity representative requests personal identification information from the consumer (step 304) for identity verification purposes over the telephone. The consumer complies with the request.

The commercial entity representative inputs the provided personal identification data into a personal identification processing system maintained by the commercial entity. The system checks the data against its internal customer database to determine if the input data is correct (step 306). If not correct, the consumer would need to repeat step 304. If correct, the representative requests that the consumer login to the commercial entity system using an instant password provided by the representative (step 308) or by the system itself. The system checks whether the input password is correct (step 310). If not correct, the consumer repeats step 308. If correct, the consumer identity has been verified (step 312), i.e. the consumer and the commercial entity representative may now safely discuss consumer's account(s).

Figure 11:
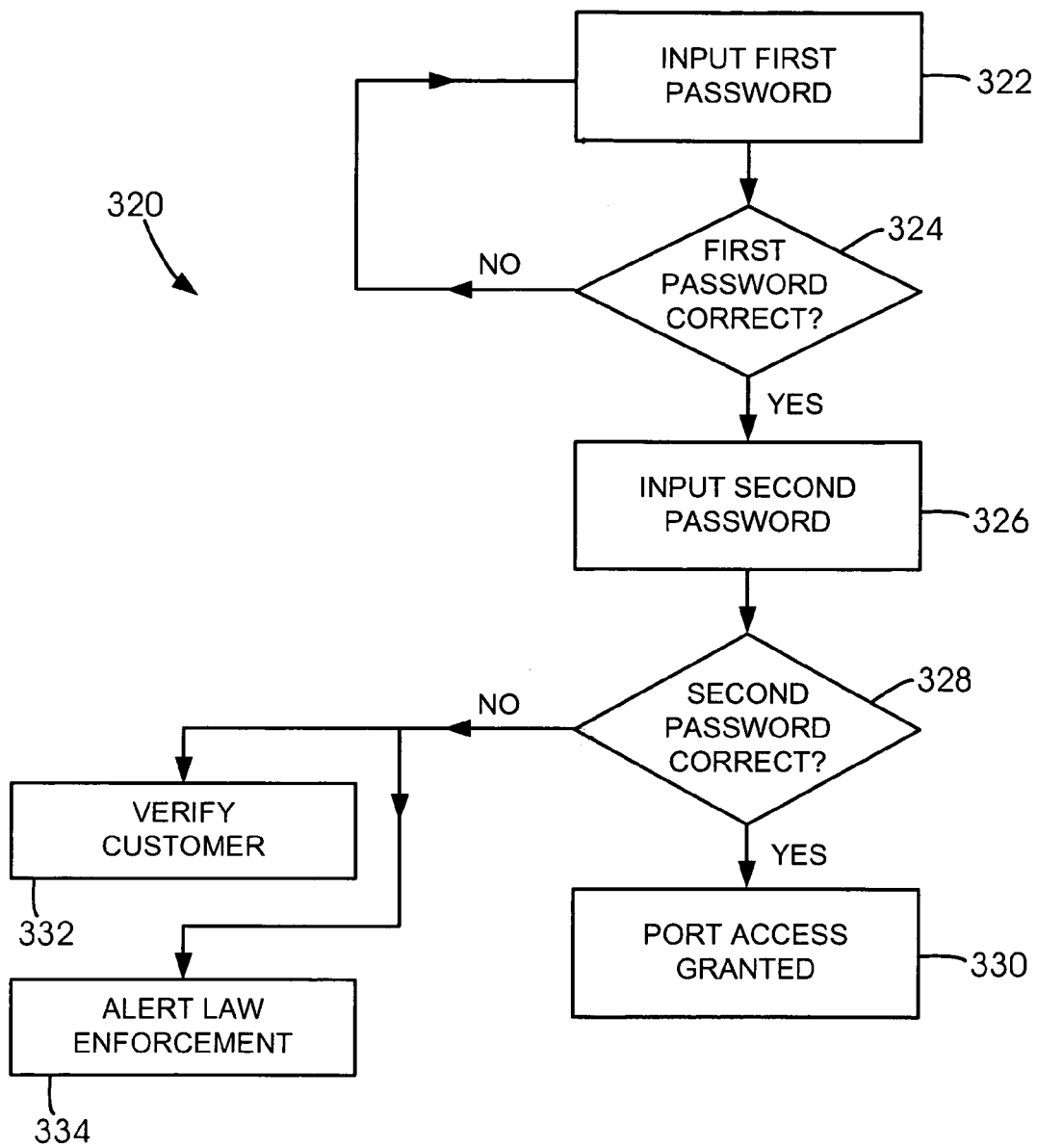
FIG. 11 is a flow chart of a secure port access method in accordance with the present invention.

FIG. 11 is a flow chart of a secure port access method 320 in accordance with the present invention. The term "port" as used herein below generally refers to any one of the following: airport, seaport, heliport, spaceport, and/or the like. For example, a person arriving at an airport may need to go through a security screening before being allowed port access such as to board a plane, enter the tax-free shopping zone, etc. Particularly, the airport security system may request that the person input a first password (step 322). A "correct" first password would have been set up in advance of travel to any destination by an individual that has been verified as to his/her identity by a local, state and/or federal government agency. The airport security system maintains database(s) storing such passwords. Verifying one's identity in advance of arriving at the airport would be advantageous for the individual as well as for airport authorities as it tends to relieve congestion, frustration, long lines at the airport and the like.

The person complies with the system request by inputting his/her first password. The password entry may be alphanumeric. The system checks the same against its database(s) to determine if the password is correct, i.e. if a match exists with a stored password (step 324). If there is no match, the person would have to repeat step 322, as schematically shown in FIG. 11. If a match exists, the system is configured to request the input of a second password (step 326) instead of granting immediately airport or plane boarding access. A "correct" second password would also have been set up in advance of travel by an individual as part of his/her identity verification by a local, state and/or federal government agency. The airport security system maintains database(s) storing passwords from verified individuals.

The person duly inputs his/her second password. The password entry does not have to be alphanumeric. It may be implemented, for example, via a fingerprint scan, iris scan, DNA profile scan, RFID tag scan and/or the like. The system checks the same against its database(s) to determine if the input second password is correct, i.e. if a match exists with a stored password (step 328). If a match does not exist, the system declines port access to the customer and verifies the customer (step 332). Specifically, the system may alert airport personnel to request and verify additional personal identification such as driver's license, passport, fingerprint scan, iris scan, etc. The system may also optionally alert law enforcement, as needed (step 334).

If a match exists, the system is configured to grant port access to the customer (step 330), e.g. the customer may board his/her plane at a certain gate, etc. A person skilled in the art would recognize that this type of system functionality may be readily accomplished in software and/or hardware form, as desired. Furthermore, more than two passwords may be utilized to assure proper customer identification, if needed.

Figure 12:
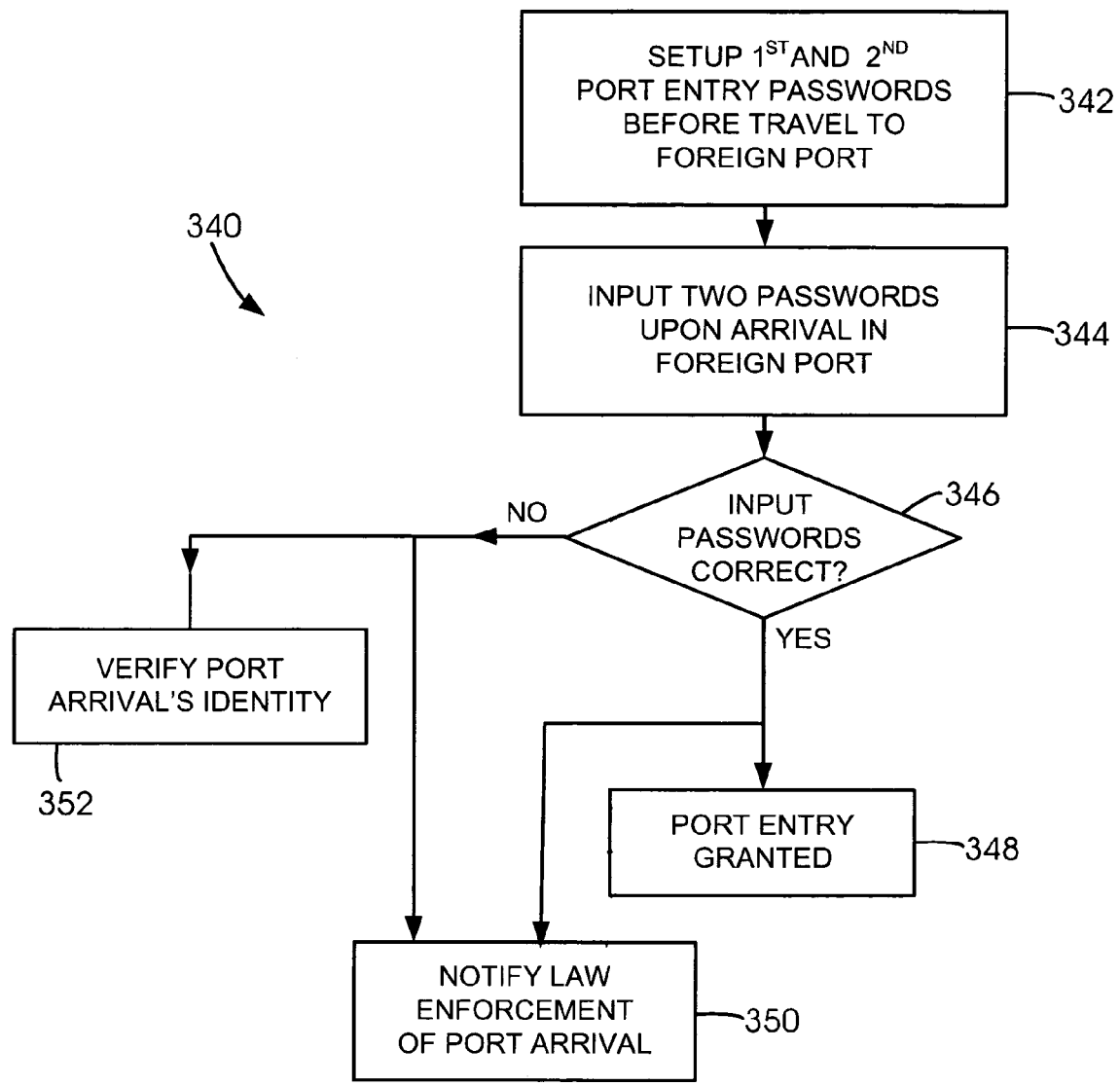
FIG. 12 is a flow chart of another secure port access method in accordance with the present invention.

FIG. 12 is a flow chart of another secure port access method 340 in accordance with the present invention. A person desiring to travel abroad may find it necessary to set up two or more passwords (for identity verification purposes) in advance of travel with the local consulate of the country of destination (step 342). Upon port arrival in the country of destination, the port security system may request that the person input his/her preset (with the consulate) first and second passwords (step 344). The port security system maintains database(s) storing records of preset identity verification passwords.

The person duly inputs two passwords. The password entries may be alphanumeric. The password entries may also be implemented via a fingerprint scan, iris scan, DNA profile scan, RFID tag scan and/or the like. The system checks the two entered passwords against appropriate database(s) to determine if the same match the first and second passwords that were set in advance with the foreign consulate (step 346).

If there is no match, the port security system is configured to decline port entry and verify the port arrival's identity (step 352). The system may also notify law enforcement of the port arrival (step 350). Identity verification may be achieved by alerting port personnel that additional personal identification is needed. Such additional personal identification may be in the form of a driver's license, passport, fingerprint scan, iris scan, etc. Law enforcement notification may be achieved by alerting law enforcement personnel via e-mail, instant messaging, automated telephone call, silent alarm signal and/or the like.

If a match exists, the port security system is configured to grant port entry (step 348) and/or notify law enforcement of the port arrival (step 350). Setting up such system functionality would be readily apparent to a person skilled in the art. Adapting the system functionality to use more than two passwords or just one password would also be apparent to a person skilled in the art.

Figure 13:
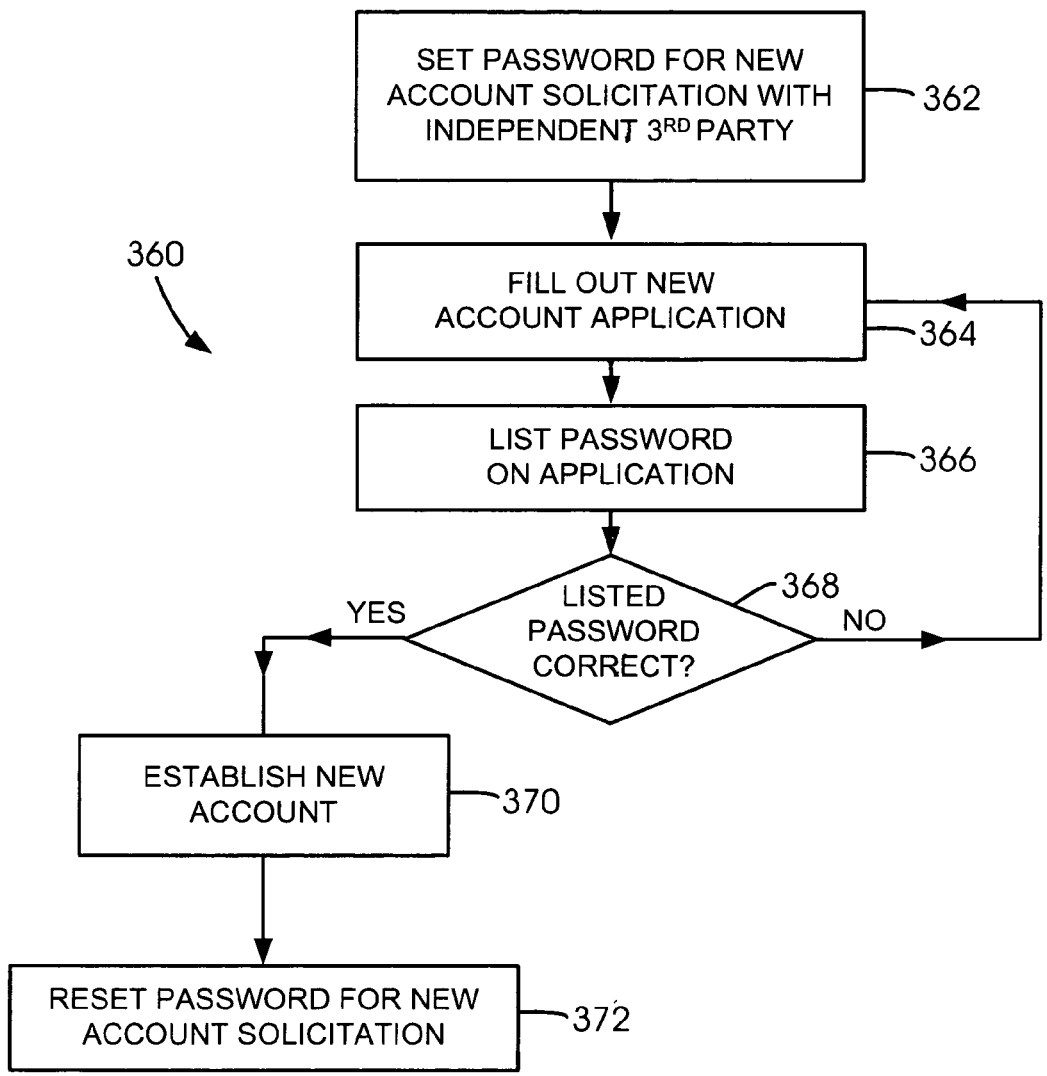
FIG. 13 is a flow chart of a secure account solicitation method in accordance with the present invention.

FIG. 13 is a flow chart of a secure account solicitation method 360 in accordance with the present invention. Consumers frequently receive solicitations by various business entities or on behalf of such entities inviting them to open new account(s) by mail, e-mail, instant messaging, telephone, fax and the like. Consumer responses to such solicitations are typically verified via Social Security Number, date and/or place of birth, mother's maiden name, etc. A problem exists with such responses in that unauthorized users, who have gained access to such personal information by various means, may use the same to open fraudulently new credit card accounts without the knowledge of the legitimate owner.

A better identity verification scheme or strategy may involve, for example, the consumer setting up a special password with an independent third party organization or entity that is to be used solely to respond to a new account solicitation (step 362). Such password may be set up (with the third party organization or entity) within a pre-defined period of time after receipt of the actual solicitation. The password entry may be an alphanumeric online entry or may be set up via telephone call, fax, e-mail, instant message, etc. Alternatively, the password entry may be implemented via fingerprint scan, iris scan, DNA profile scan, RFID tag scan and/or the like. The password entry would be accepted by the independent third party after the consumer provides sufficient identity verification. The independent third party entity may be picked, for example, from one of the three major consumer credit bureaus. Other business entities or organizations may be utilized as well on a fee or non-fee basis.

After the special password has been set up, the consumer may fill out the new consumer account application (step 364). The preset special password should be listed on the consumer account application (step 366). The filled out application is processed by the party soliciting the new consumer account or the party on whose behalf the new consumer account is being solicited. During application processing, the password listed on the consumer account application is checked for accuracy against a database maintained by the independent third party organization or entity (step 368). A new account processing system (employed by the soliciting party or other related parties) looks for a match between the listed password and the preset (special) new account solicitation password. If there is no match, the consumer would have to repeat step 364, i.e. fill out another new account application. If a match exists, a new account may be established for the consumer (step 370).

The preset new account solicitation password may be subsequently reset by the consumer (step 372), if desired. Even if an unauthorized user gains access to a consumer's Social Security Number, date and/or place of birth, mother's maiden name, and/or other valuable personal information, no new account(s) can be fraudulently opened without knowledge of the special preset password.

The strategy-driven methodology of the present invention provides a number of advantages to the system user. The user may set up one initial (login) password for all his/her accounts, which is relatively easy to remember. The provision of at least one additional level of identity protection, which involves the system querying the user instead of granting system access, as practiced conventionally, does not require the user to type various responses over and over again on a computer keyboard. The user simply chooses one or more correct responses (that were previously set up by the user) from option list(s) presented by the system. The user is more likely to remember the correct response(s) to statements/questions that have been set up in advance by the user himself/herself rather than by the system.

By prompting visually and/or audibly the user with information that has been preset by the user himself/herself, the need to remember an ever growing list of different passwords is eliminated. One may even take notice that the additional level(s) of identity protection/verification contemplated by the present invention is/are in a way "built-in" or even "stored" in the option list(s) presented by the system to the user. An authorized user may "store" personal details in each of the above-described option lists presented by the system, i.e. option lists may be also used as filing cabinets. There is no need to use one's Social Security Number, mother's maiden name, driver's license information or other valuable personal information over public networks, at stores, banks and the like any more as means of identity verification.

One or more exemplary embodiments of the present invention, as generally described hereinabove, may be readily modified for use with e-mail, wherein part of an e-mail or an entire e-mail should only be accessed by a specific user (e.g., classified information, financial data containing e-mails). For example, one may not want his/her secretary to be able to read everything that comes through classified e-mails that may be interrupted. Also, sections of e-mail(s) may be relevant only to specific individuals in an organization, etc.

Some exemplary embodiments of the present invention, as generally described hereinabove, may be modified for use in connection with accessing a bank ATM, wherein one not only inputs his/her PIN, but also selects one or more choices on the ATM screen by touching the screen in pre-designated fields. Choice selection may be implemented not only by using touch screen technology, but also by using voice recognition technology.

Other exemplary embodiments of the present invention, as generally described hereinabove, may be modified for use in connection with secure online issuance of a boarding pass, wherein someone cannot simply access and print boarding passes by knowing one's name or credit card number, or frequent flyer number.

Still other exemplary embodiments of the present invention, as generally described hereinabove, may be modified to employ an "intelligent" option processing system. Specifically, the system may be programmed to intelligently "guess" that a hacker is trying to break in if the hacker attempts to pick the correct choice presented by the system by pointing his/her cursor from one presented choice to another in a random or organized fashion.

A person skilled in the art would appreciate that the exemplary embodiments described hereinabove are merely illustrative of the general principles of the present invention. Other modifications and/or variations may be employed that reside within the scope of the invention. For example, the strategy-driven methodology of the present invention may be readily adapted for use with PCs, laptop computers, mobile PCs, PDAs (Personal Digital Assistants), cellular telephones, and/or the like.

The strategy-driven methodology of the present invention may also be adapted for use in connection with opening new credit card accounts, brokerage accounts, bank accounts, school accounts, bank cash transactions, existing credit/debit card accounts, setting up of new service accounts, protection of lost/stolen wallets or checkbooks, credit offer letters, bank statements, tax forms, convenience checks, personnel records, payroll information, insurance papers, account numbers, sales numbers, physician services, online travel bookings, online gambling transactions, personal or business checks, mortgage accounts, and/or supplier/company accounts.

The strategy-driven methodology of the present invention may further be adapted for use in connection with application development processes, airport security, ATM (Automated Teller Machine) transactions, magnetic cards, contactless cards, smart cards, electronic filing cabinet, e-mail, e-mail attachment(s) as part of e-mail, online issuance of boarding pass, estate planning, consumer credit reports, death, or other calamity where criminal elements cannot work alone on stolen papers but will need online identity information that loved ones may have in their possession, internet service accounts, e-mail accounts, credit card application fraud, bankruptcy fraud, cellular telephone fraud, charity fraud, check fraud, commercial loan fraud, various con games, credit card fraud, election fraud, food stamp fraud, insurance fraud, merchant fraud, healthcare fraud, money laundering, various illegal pyramid schemes, securities fraud, real estate mortgage fraud, telemarketing fraud, workers compensation fraud, and/or terrorism prevention activities.

Thus, by way of example, but not of limitation, alternative configurations may be utilized in accordance with the teachings herein. Accordingly, the drawings and description are illustrative and not meant to be a limitation thereof. All terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Thus, it is intended that the invention cover all embodiments and variations thereof as long as such embodiments and variations come within the scope of the appended claims and their equivalents.

The invention claimed is:

1. A strategy-driven methodology for reducing identity theft, comprising the steps of: gaining system access to a device;
   presenting at least one list of user choices instead of granting system access, said at least one list containing at least one choice that is preset by a registered user;
   selecting at least one choice from said at least one list, wherein each of said associated lists of responses contain dynamic statement responses, said dynamic statement response includes one or more attributes;
   electronically changing said attributes based on a user defined preset rule
   and granting system access if said at least one selected choice matches said at least one preset choice.

2. The strategy-driven methodology of claim 1, wherein said at least one preset choice is in the form of a dynamic statement.

3. The strategy-driven methodology of claim 1, wherein said at least one preset choice is in the form of a static statement.

4. The strategy-driven methodology of claim 1, wherein said at least one presented list contains dynamic and static user choices.

5. A strategy driven-methodology for reducing identity theft, comprising the steps of:
   inputting a system password;
   checking the input password for accuracy;
   inputting a response to at least one system query preset by a registered user if the input password is accurate, wherein the response contains a dynamic statement response, said dynamic statement response includes one or more attributes;
   electronically changing said attributes based on a user defined preset rule;
   checking the input response for accuracy; and
   granting access to the secure system website if the input response to said at least one preset system query is accurate.

6. The strategy-driven methodology of claim 5, further comprising the step of notifying the registered user of system access.

7. The strategy-driven methodology of claim 5, further comprising the step of inputting a new password if the input password is not accurate.

8. The methodology of claim 5, further comprising the step of denying system access if the input response to said at least one preset system query is inaccurate.

9. A strategy-driven methodology for reducing identity theft, comprising the steps of: operatively coupling a computer to a secure system website over a network;
   inputting a system password via said computer;
   checking the input system password for accuracy;
   selecting at least one choice from one system query, wherein, at least one system query contains a choice that is preset by a registered user and said system query contains both dynamic and static user choices;
   inputting a response to at least one system query preset by a registered user, if the input system password is accurate; wherein the response contains a dynamic statement response, said dynamic statement response includes one or more attributes;
   electronically changing said attributes based on a user defined preset rule;
   checking the input response for accuracy; and granting access to the secure system website if the input response to said at least one preset system query is accurate.

10. The strategy-driven methodology of claim 9, wherein the network is public.

11. The strategy-driven methodology of claim 9, wherein the network is private.

12. A strategy-driven methodology for reducing identity theft, comprising the steps of:
    inputting a user name as part of a system login sequence;
    checking the input user name for accuracy;
    inputting a system password if the input user name is accurate;
    checking whether the input system password is correct;
    if the input system password is correct, presenting at least one list of user choices from an option list, instead of granting system access, said at least one list containing at least one choice that is preset by a registered user;
    selecting at least one choice from an option list preset by a registered user wherein each option list contain dynamic statement responses, said dynamic statement response includes one or more attributes;
    electronically changing said attributes based on a user defined preset rule
    checking said at least one selected choice for accuracy; and
    granting system access if said at least one selected choice from said preset option list is accurate.

13. The strategy-driven methodology of claim 12, further comprising the step of notifying the registered user of system access.

14. The strategy-driven methodology of claim 12, further comprising the step of denying system access if said at least one selected choice from said preset option list is inaccurate.

15. The strategy-driven methodology of claim 12, wherein said option list contains dynamic user choices.

16. The strategy-driven methodology of claim 12, wherein said option list contains static user choices.

17. The strategy-driven methodology of claim 12, wherein said option list contains dynamic and static user choices.

18. A secure system access method, said method comprising the steps of:
    selecting at least one question from a system list of questions, each question from said system list being presented with an associated list of responses, each of said responses and questions being respectively preset by an authorized user;
    selecting at least one response from a list of responses to said at least one question, wherein each of said associated list of responses contain dynamic statement response, said dynamic statement response includes one or more attributes;

electronically changing said attributes based on a user defined preset rule;

checking said at least one selected response for accuracy;

and granting system access if said at least one selected response is accurate.

19. The secure system access method of claim 18, further comprising the step of notifying the authorized user of the granted system access.

20. The secure system access method of claim 18, further comprising the step of denying system access if said at least one selected response is inaccurate.

21. The secure system access method of claim 20, further comprising the step of verifying the system user.

22. The secure system access method of claim 20, further comprising the step of notifying the authorized user of the attempted system access.

23. The secure system access method of claim 18, wherein said system list of questions contains dynamic entries.

24. The secure system access method of claim 18, wherein said system list of questions contains static entries.

25. The secure system access method of claim 18, wherein said system list of questions contains dynamic and static entries.

26. The secure system access method of claim 18, wherein each of said associated lists of responses contains dynamic entries.

27. The secure system access method of claim 18, wherein each of said associated lists of responses contains static entries.

28. The secure system access method of claim 18, wherein each of said associated lists of responses contains dynamic and static entries.

29. The strategy-driven methodology of claim 1, further comprising the step of declining system access if said at least one choice selected in a random fashion.

30. The strategy-driven methodology of claim 1, further comprising the step of declining system access if said at least one choice is being selected in an organized fashion.

* * * * *